US007676142B1

(12) United States Patent
Hung

(10) Patent No.: US 7,676,142 B1
(45) Date of Patent: Mar. 9, 2010

(54) SYSTEMS AND METHODS FOR MULTIMEDIA TIME STRETCHING

(75) Inventor: Andy Chao Hung, Los Altos, CA (US)

(73) Assignee: Corel Inc., Ottawa, Ontario (CA)

( * ) Notice: Subject to any disclaimer, the term of this patent is extended or adjusted under 35 U.S.C. 154(b) by 1574 days.

(21) Appl. No.: 10/458,066

(22) Filed: Jun. 9, 2003

Related U.S. Application Data

(60) Provisional application No. 60/387,280, filed on Jun. 7, 2002.

(51) Int. Cl.
*H04N 5/91* (2006.01)
*H04N 7/01* (2006.01)
*H04N 7/173* (2006.01)

(52) U.S. Cl. .................... 386/131; 386/68; 386/75; 348/446; 725/88; 725/102

(58) Field of Classification Search .............. 725/88, 725/102; 386/131, 68, 75; 348/446
See application file for complete search history.

(56) References Cited

U.S. PATENT DOCUMENTS

| | | | | |
|---|---|---|---|---|
| 4,879,606 A | * | 11/1989 | Walter et al. .................. | 386/26 |
| 5,664,044 A | * | 9/1997 | Ware ........................... | 386/75 |
| 5,717,823 A | | 2/1998 | Kleijn | |
| 5,874,997 A | * | 2/1999 | Haigh .................... | 375/240.25 |
| 5,909,224 A | * | 6/1999 | Fung ........................... | 345/531 |
| 5,949,410 A | * | 9/1999 | Fung ........................... | 715/203 |
| 6,049,766 A | | 4/2000 | Laroche | |
| 6,096,664 A | * | 8/2000 | Rupp et al. ................. | 438/275 |
| 6,169,240 B1 | | 1/2001 | Suzuki | |
| 6,370,315 B1 | * | 4/2002 | Mizuno ........................ | 386/46 |
| 6,490,553 B2 | | 12/2002 | Van Thong et al. | |
| 6,519,567 B1 | | 2/2003 | Fujii | |
| 7,047,494 B2 | * | 5/2006 | Wu et al. ..................... | 715/723 |
| 7,139,626 B2 | * | 11/2006 | Kataoka ....................... | 700/94 |
| 7,295,247 B2 | * | 11/2007 | Bang .......................... | 348/515 |
| 2005/0091690 A1 | * | 4/2005 | Delpuch et al. ............... | 725/88 |
| 2006/0236359 A1 | * | 10/2006 | Lee ............................. | 725/133 |
| 2008/0117329 A1 | * | 5/2008 | Wyman ...................... | 348/448 |

OTHER PUBLICATIONS

InterVideo, Inc., InterVideo WinDVD User's Guide, Jan. 11, 1999, InterVideo, Inc.*
InterVideo Ships WinDVD4. Press release [online]. InterVideo, Inc., 2002 [retrieved on Sep. 5, 2003]. Retrieved from the Internet: <URL: www.intervideo.com/jsp/Press.jsp?mode=05-08-2002>.
InterVideo WinDVD4. Datasheet [online]. InterVideo, Inc., 2002 [retrieved on Sep. 5, 2003]. Retrieved from Internet: <URL: http://206.112.112.154/trial/support/Datasheet.pdf>.

* cited by examiner

*Primary Examiner*—Hoang-Vu A Nguyen-Ba
(74) *Attorney, Agent, or Firm*—Rosenberg, Klein & Lee

(57) ABSTRACT

The invention is related to methods and apparatus that can advantageously alter a playback rate of a multimedia presentation, such as a video clip. One embodiment of the invention permits a multimedia presentation to be sped up or slowed down with a controlled change in pitch of the sped up or slowed down audio. In one embodiment, this controlled change in the pitch permits the sped up or slowed down audio to retain a same sounding pitch as at normal playback speeds. In one embodiment, a duration is specified and playback of the video clip is advantageously sped to complete playback within the specified duration. In another embodiment, a finish by a time is specified, and the playback of the video clip is advantageously sped to complete playback by the specified time.

95 Claims, 14 Drawing Sheets

EXAMPLE: COMMON 4 PROGRESSIVE FRAMES TO 5 INTERLACED FRAMES CONVERSION

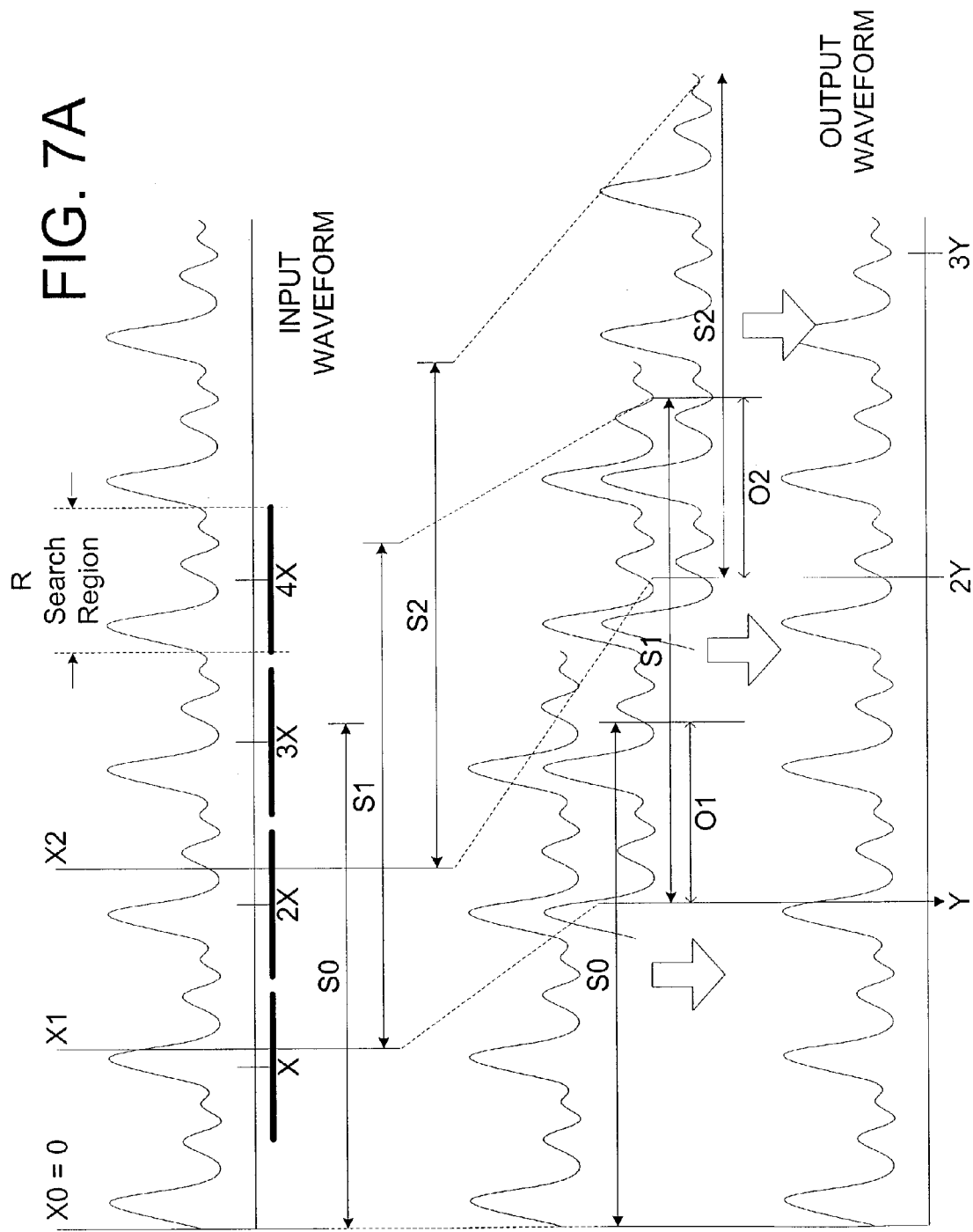

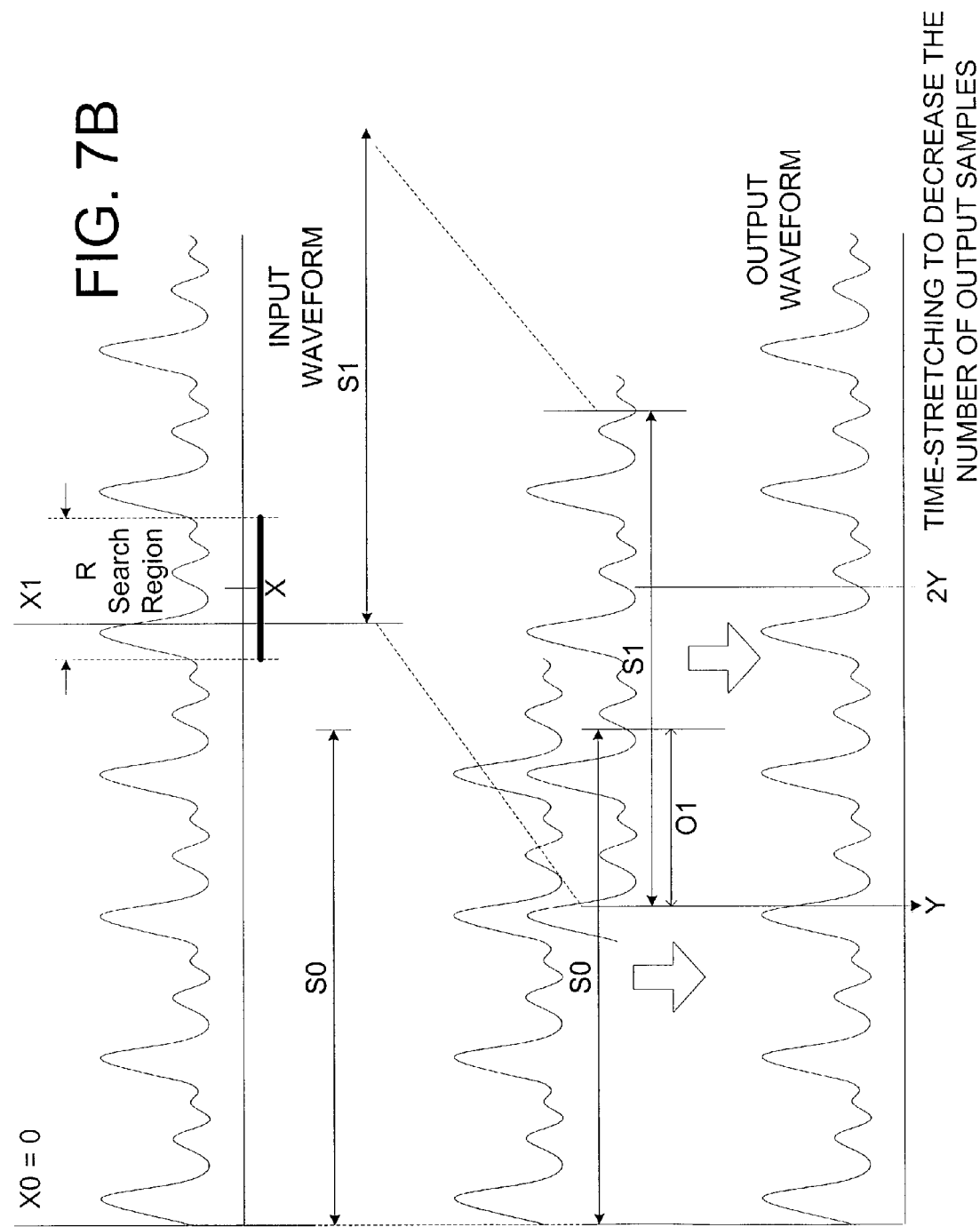

SYSTEMS AND METHODS FOR MULTIMEDIA TIME STRETCHING

RELATED APPLICATION

This application claims the benefit under 35 U.S.C. §119(e) of U.S. Provisional Application No. 60/387,280, filed Jun. 7, 2002, the entirety of which is hereby incorporated by reference.

BACKGROUND OF THE INVENTION

1. Field of the Invention

The invention generally relates to digital video multimedia. In particular, the invention relates to audio processing of digital video multimedia.

2. Description of the Related Art

People watch videos for a variety of purposes. For example, videos can be used for entertainment, for education, for communication, and the like. Consumer video can be derived from analog sources, such as videotapes, and from digital sources, such as digital versatile discs (DVDs), video compact discs (VCDs), hard disks, computer networks, direct broadcast satellite (DBS), digital cable, and the like.

Often, one of the constraints placed on the viewing of video is time. For example, a user may desire to view a prerecorded video clip within a time period that is shorter than the run time of the video. Examples include during the duration of a flight, during a class period, during a lunch break, before the beginning of a live program, and the like. In another example, the device that is used to view the video may be battery powered and may not have enough battery life to display the entire video clip at its normal run time without speeding up the presentation of the video clip. In another example, a user who is learning a language may desire to slow down the rate at which words are spoken in a video.

As a result, it is desirable to provide the ability to adjust the speed of a video clip. A video clip typically includes both visual information and audio information, which are synchronized together. The adjusting of the speed of the visual information is relatively simple. Simple techniques, such as increasing or decreasing the frame rate, i.e., the rate at which visual images are displayed, or deleting or repeating images to effectively change the frame rate, can suffice adjusting the speed of visual information. By contrast, a mere change in rate for audio samples is undesirable. When audio samples are merely sped up or slowed down by changing the frame rate or changing the sampling rate, the corresponding pitch of the audio also changes. For example, when a playback rate of audio is merely increased, the familiar effect of vocals is sometimes referred to as "chipmunking." In another example, the mere deletion or the mere duplication of audio samples can result in undesirable clicks, pops and other audible artifacts.

SUMMARY OF THE INVENTION

The invention is related to methods and apparatus that can advantageously alter a playback rate of a multimedia presentation, such as an audio-video clip. One embodiment of the invention advantageously provide techniques that permit multimedia presentations to be sped up or slowed down, permit audio and video to remain synchronized, and permit the audio pitch to be controlled. For example, the audio pitch can be controlled such that the speed up or slow down of the multimedia presentation does not result in an audible change in the pitch of the sped up or slowed down audio. Another embodiment of the invention permits a multimedia presentation to be sped up or slowed down with a controlled change in pitch of the sped up or slowed down audio. In one embodiment, a duration is specified and playback of the video clip is advantageously sped to complete playback within the specified duration. In another embodiment, a finish by a time is specified, and the playback of the video clip is advantageously sped to complete playback by the specified time.

One embodiment of the invention includes a method of altering a speed of a multimedia presentation that includes: receiving encoded data for the multimedia presentation that has been compressed by a video compression process, where the multimedia presentation is intended to be presented at a first frame rate; decoding visual data from the encoded data; decoding audio data from the encoded data; performing a time-stretching process on the decoded audio data, where the time stretching process changes a number of samples of the audio data such that the audio data can be presented at a second effective frame rate that is effectively different from the first frame rate, where a pitch of the audio data is controlled; and providing decoded visual data and decoded audio data for presentation at the second effective frame rate, where the decoded visual data and the decoded audio data are synchronized.

One embodiment of the invention includes a method of altering a speed of a multimedia presentation that includes: receiving data for the multimedia presentation, where the multimedia presentation is intended to be presented at a first frame rate; performing a time-stretching process on the audio data, where the time stretching process changes the audio data such that the audio data can be presented at a second effective frame rate that is effectively different from the first frame rate, where a pitch of the audio data is controlled; and providing visual data and audio data for presentation at the second effective frame rate, where the visual data and the audio data are synchronized.

One embodiment of the invention includes a computer readable medium with computer executable instructions for altering a speed of a multimedia presentation, where the computer readable medium includes: instructions for receiving encoded data for the multimedia presentation that has been compressed by a video compression process, where the multimedia presentation is intended to be presented at a first frame rate; instructions for decoding visual data from the encoded data; instructions for decoding audio data from the encoded data; instructions for performing a time-stretching process on the decoded audio data, where the time stretching process changes a number of samples of the audio data such that the audio data can be presented at a second effective frame rate that is effectively different from the first frame rate, where a pitch of the audio data is controlled; and instructions for providing decoded visual data and decoded audio data for presentation at the second effective frame rate, where the decoded visual data and the decoded audio data are synchronized.

One embodiment of the invention includes a circuit for altering a speed of a multimedia presentation comprising: means for receiving encoded data for the multimedia presentation that has been compressed by a video compression process, where the multimedia presentation is intended to be presented at a first frame rate; means for decoding visual data from the encoded data; means for decoding audio data from the encoded data; means for performing a time-stretching process on the decoded audio data, where the time stretching process changes a number of samples of the audio data such that the audio data can be presented at a second effective frame rate that is effectively different from the first frame rate, where a pitch of the audio data is controlled; and means for providing decoded visual data and decoded audio data for presentation at the second effective frame rate, where the decoded visual data and the decoded audio data are synchronized.

One embodiment of the invention includes a circuit adapted to alter a speed of a multimedia presentation comprising: to receive encoded data for the multimedia presentation that has been compressed by a video compression process, where the multimedia presentation is intended to be presented at a first frame rate; to decode visual data from the encoded data; to decode audio data from the encoded data; to perform a time-stretching process on the decoded audio data, where the time stretching process changes a number of samples of the audio data such that the audio data can be presented at a second effective frame rate that is effectively different from the first frame rate, where a pitch of the audio data is controlled; and to provide decoded visual data and decoded audio data for presentation at the second effective frame rate, where the decoded visual data and the decoded audio data are synchronized.

One embodiment of the invention includes a method of presenting a multimedia presentation, where the method includes: receiving an indication of a selected time duration; playing back the multimedia presentation at a revised playback rate from an original playback rate such that playback can be completed within the selected time duration; and modifying audio data during playback such that a pitch of the time-stretched audio data is controlled.

One embodiment of the invention includes a method of presenting a multimedia presentation that includes: receiving an indication of a selected time duration; playing back the multimedia presentation at a revised playback rate from an original playback rate such that playback can be completed within the selected time duration; and modifying audio data during playback such that a pitch of the time-stretched audio data is controlled.

One embodiment of the invention includes a method of presenting a multimedia presentation that includes: receiving an indication of a selected time; playing back the multimedia presentation at a revised playback rate from an original playback rate such that playback can be completed by the selected time; and modifying audio data during playback such that a pitch of the time-stretched audio data is controlled.

One embodiment of the invention includes a user interface that includes: a module configured to receive an indication of a request for a speed of a multimedia presentation, where the speed relates to a playback speed and can correspond to playback speeds other than a normal playback speed; and a module configured to provide the indication to a video decoder.

One embodiment of the invention includes a method of presenting a digital multimedia presentation, where the method includes: presenting visual data and audio data at a playback rate other than a speed of playback of the multimedia presentation as specified by a corresponding video compression standard; and modifying the audio data to a time-stretched audio data such that a pitch of the time-stretched audio data is controlled.

One embodiment of the invention includes a computer readable medium with computer executable instructions for presenting a digital multimedia presentation, the computer readable medium including: instructions for presenting visual data and audio data at a playback rate other than a speed of playback of the multimedia presentation as specified by a corresponding video compression standard; and instructions modifying the audio data to a time-stretched audio data such that a pitch of the time-stretched audio data is controlled.

One embodiment of the invention includes a circuit for presenting a digital multimedia presentation in a video decoder, where the circuit includes: means for presenting visual data and audio data at a playback rate other than a speed of playback of the multimedia presentation as specified by a corresponding video compression standard; and means for modifying the audio data to a time-stretched audio data such that a pitch of the time-stretched audio data is controlled.

One embodiment of the invention includes a circuit adapted to present a digital multimedia presentation in a video decoder, where the circuit includes: a module configured to present visual data and audio data at a playback rate other than a speed of playback of the multimedia presentation as specified by a corresponding video compression standard; and a module configured to modify the audio data to a time-stretched audio data such that a pitch of the time-stretched audio data is controlled.

One embodiment of the invention also allows controlling the pitch of the audio data to an input pitch shift parameter such that the pitch of the audio data can vary from the original pitch and yet advantageously not incur the "chipmunking" effect of merely speeding up or slowing down the audio data directly with the video data. In one embodiment, the pitch can be controlled to vary between the original pitch and the pitch that would result from a mere speeding up or slowing down of the audio data directly with the speeding up and slowing down of the video data. One embodiment of the invention includes a method of altering a speed of a multimedia presentation, where the time-stretching process changes a number of samples of the audio data such that the audio data can be presented at a second effective frame rate that is effectively different from the first frame rate, where the time-stretching process maintains a sampling rate of the audio data such that an original pitch of the audio data can be controlled by an input pitch shift parameter; and providing decoded visual data and decoded audio data for presentation at the second effective frame rate, where the decoded visual data and the decoded audio data are synchronized.

One embodiment further includes techniques that enhance the computational efficiency of the time-stretching process.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 7A illustrates an example of audio waveforms in time stretching in connection with an increase in the number of output samples.

FIG. 7B illustrates an example of audio waveforms in time stretching in connection with a reduction in the number of output samples.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention.

One embodiment of the invention advantageously provide techniques that permit video to be sped up or slowed down without an audible change in the pitch of the sped up or slowed down audio. Another embodiment of the invention advantageously provides techniques that permit video to be sped up or slowed down with a controlled change in the pitch of the sped up or slowed down audio. As used herein, the term "time stretching" relates to speeding up audio, to slowing down audio, and to both speeding up and slowing down audio.

For example, a duration can be specified and playback of the video clip can advantageously be sped to complete playback within the specified duration. In another embodiment, a finish by a time can be specified, and the playback of the video clip can advantageously be sped to complete playback by the specified time.

A variety of digital video compression techniques have arisen to transmit or to store a video signal with a lower data rate or with less storage space. Such video compression techniques include international standards, such as H.261, H.263, H.263+, H.263++, H.264, MPEG-1, MPEG-2, MPEG-4, and MPEG-7. These compression techniques achieve relatively high compression ratios by discrete cosine transform (DCT) techniques and motion compensation (MC) techniques, among others. Such video compression techniques permit video data streams to be efficiently carried across a variety of digital networks, such as wireless cellular telephony networks, computer networks, digital cable networks, direct broadcast satellite (DBS), and the like, and to be efficiently stored on storage mediums such as hard disks, optical disks, Video Compact Discs (VCDs), digital video discs (DVDs), and the like.

While embodiments of the invention are described in the context of MPEG-2 and pictures, the principles and advantages described herein are also applicable to other video compression techniques or standards including video standards yet to be developed. The term "frame" will be used herein and encompasses pictures, images, frames, visual object planes (VOPs), and the like. A video sequence includes multiple video images usually taken at periodic intervals. The rate at which the frames are displayed is referred to as the frame rate. The frames in a sequence of pictures can correspond to either interlaced images or to non-interlaced images, i.e., progressive images. In an interlaced image, each image is made of two separate fields, which are interlaced together to create the image. No such interlacing is performed in a non-interlaced or progressive image. Embodiments of the invention can be used with both interlaced frames and with non-interlaced frames.

Figure 1:
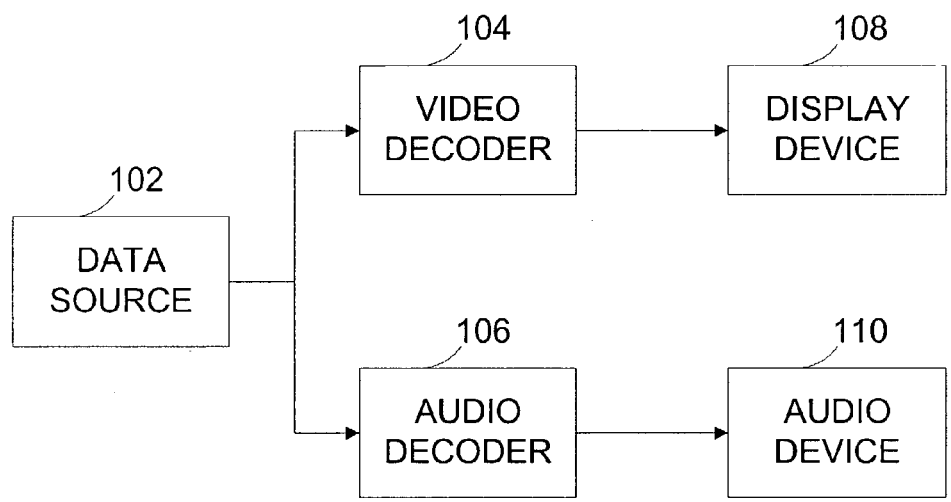
FIG. 1 illustrates a block diagram of a configuration for a multimedia playback device.

FIG. 1 illustrates a block diagram of an example of a configuration for a multimedia playback device in which an embodiment of the invention can be implemented. More detailed block diagrams are described later in connection with FIGS. 3 and 4. A data source 102 provides a video decoder 104 and an audio decoder 106 with a video data stream. The data source 102 can correspond to a variety of devices. For example, the data source 102 can correspond to optical computer drives configured to read optical media, such as a digital versatile disc (DVD), a recordable DVD, a Video CD (VCD), and the like. In another example, the data source 102 can correspond to an optical drive or reader that is part of a DVD player or other multimedia player. The data source 102 can also correspond to a hard disk or other form of mass storage in a computer, digital video recorder, or other electronic device. In another embodiment, the data source 102 corresponds to a communication module that is adapted to retrieve information from a communication link, such as a computer network including local area networks, wireless networks, dial up networks, broadband networks, wireless networks; a digital cable network; reception from terrestrial digital television; reception of direct broadcast satellite (DBS); and the like.

The video decoder 104 and the audio decoder 106 can correspond to dedicated hardware devices, such as application specific integrated circuits, programmable gate arrays, programmable logic devices, discrete logic devices, and the like, and to software that is executed by a CPU, such as a microprocessor. The pictures or frames that are decoded by the video decoder 104 are provided as an input to a display device 108. For example, the display device 108 can correspond to cathode ray tubes, liquid crystal displays, computer monitors, regular television sets, high definition television sets, projection devices, plasma display devices, and the like. The audio information that is decoded by the audio decoder 106 can be provided to an audio device 110, such as to an amplifier, to speakers, to headphones, and the like. The video decoder 104 and the audio decoder 106 should be configured such that the frames displayed by the display device 108 and the audio provided from the audio device 110 are synchronized.

The techniques presented can be implemented and executed by, for example, a general-purpose processor executing instructions from a memory unit. In another example, the techniques can be implemented in software, where the instructions in the memory unit are adapted to execute the presented method, or implemented in hardware, where logic in a circuit, such as in an integrated circuit, performs the operations corresponding to the software instructions, or implemented by a combination of hardware and software, where part of the operations are obtained through microprocessor instructions and part of the operations are performed in a logic circuit.

Figure 2:
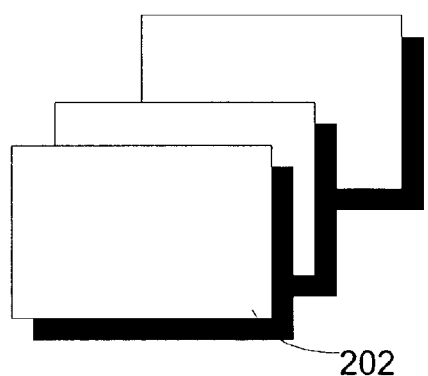
FIG. 2 illustrates a sequence of pictures or frames.

FIG. 2 illustrates a sequence of pictures or frames 202. The sequence of pictures can correspond to a movie or other presentation. The rate at which the pictures or frames are displayed is referred to as the frame rate. It can be relatively simple to change the frame rate for visual information. For example, when the display device 108 can handle multiple frame rates, the frame rate can simply be increased or decreased. For example, a computer monitor is typically capable of handling multiple frame rates.

In addition, a display device, such as a computer monitor, can have a refresh rate that is faster than the frame rate of a media presentation. In this situation, selected frames of the media presentation can be repeated such that the effective frame rate of the media presentation varies from the actual frame rate provided to the display device. Changing frame rates for video will be described in greater detail later in connection with FIGS. 5A and 6.

In other systems, such as in a typical television set, the actual frame rate can be fixed at about 29.97 Hz for a television conforming to the NTSC standard and fixed to about 25 Hz for a television conforming to the PAL standard or to the SECAM standard. For these display devices, an effective frame rate perceived by a viewer can be achieved by methods described in greater detail later in connection with FIGS. 5A and 6.

Figure 3:
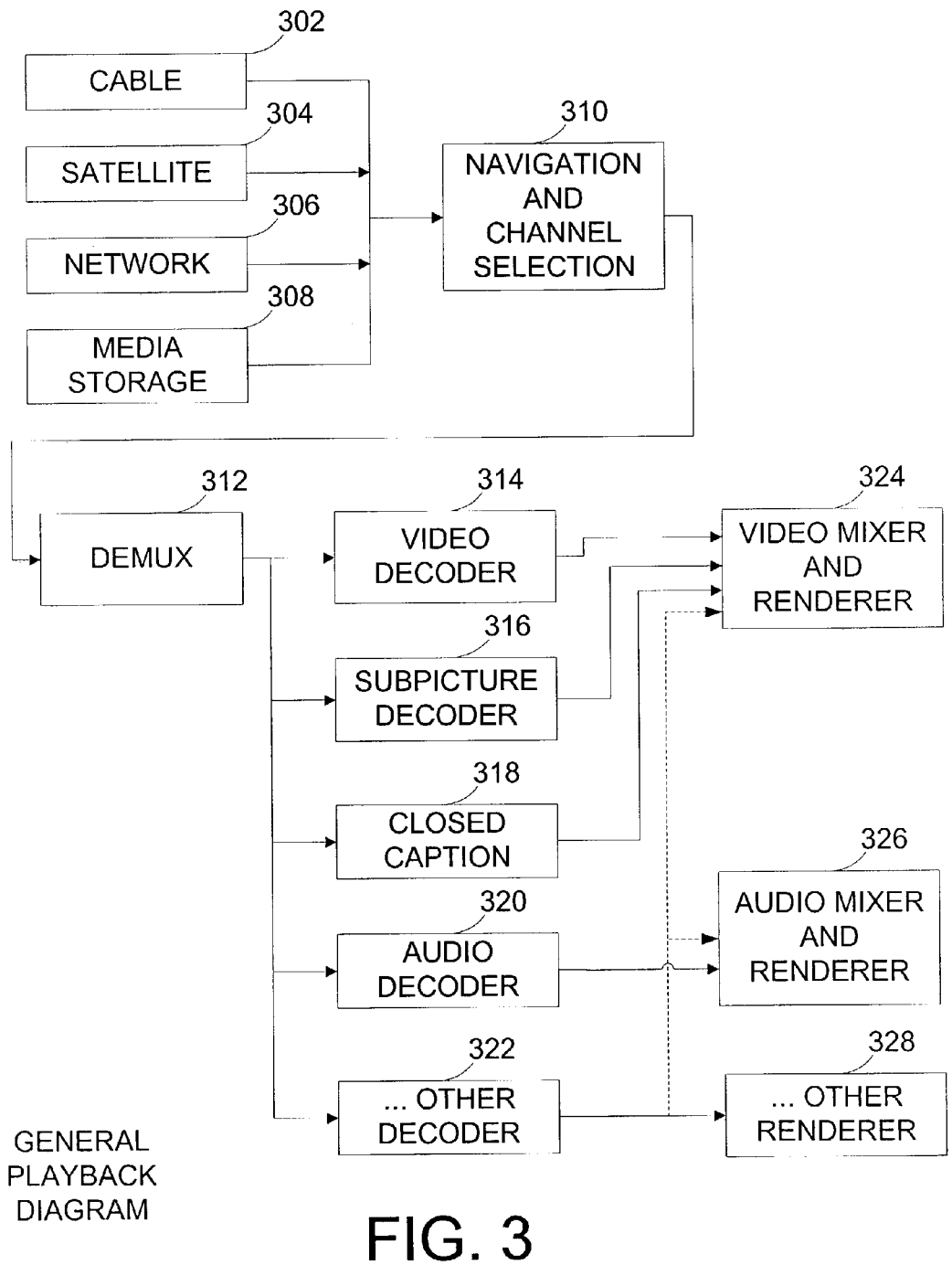
FIG. 3 illustrates a general playback structure.

FIG. 3 illustrates a general playback structure without time stretching illustrated. The input or video data can be provided from a variety of sources, such as a digital cable network 302, a direct broadcast satellite network 304, or an electronic network 306, which can include a computer network such as the Internet. It will be understood that the video data can be retrieved or demultiplexed from a data channel that is multiplexed with other data channels.

The input can also be retrieved from a media storage 308, such as from a hard disk or an optical disk. Other input sources include a terrestrial broadcast source, a network streaming device, wireless networks, and the like. The data is provided to a data navigator and/or channel selector 310, which selects the appropriate multimedia program stream to play. The multimedia program data stream is then provided to a demultiplexer 312 (or demux), which separates out the elementary data streams for each media component from the selected multimedia program stream. The elementary streams are then decoded by an appropriate decoder 314, 416, 318, 320, 322 and sent to the appropriate mixer and renderer 324, 326, 328 for presentation. For example, the video decoder 314 can decode visual images. The subpicture decoder 316 can decode subtitles, menu information, and the like, which can be blended with the video. The closed caption decoder 318 can decode closed caption data, which for example, can be presented in line 21 of an NTSC data stream. The audio decoder 320 can decode audio information. In one embodiment, the audio decoder 320 is configured to decode multiple channels.

Figure 4:
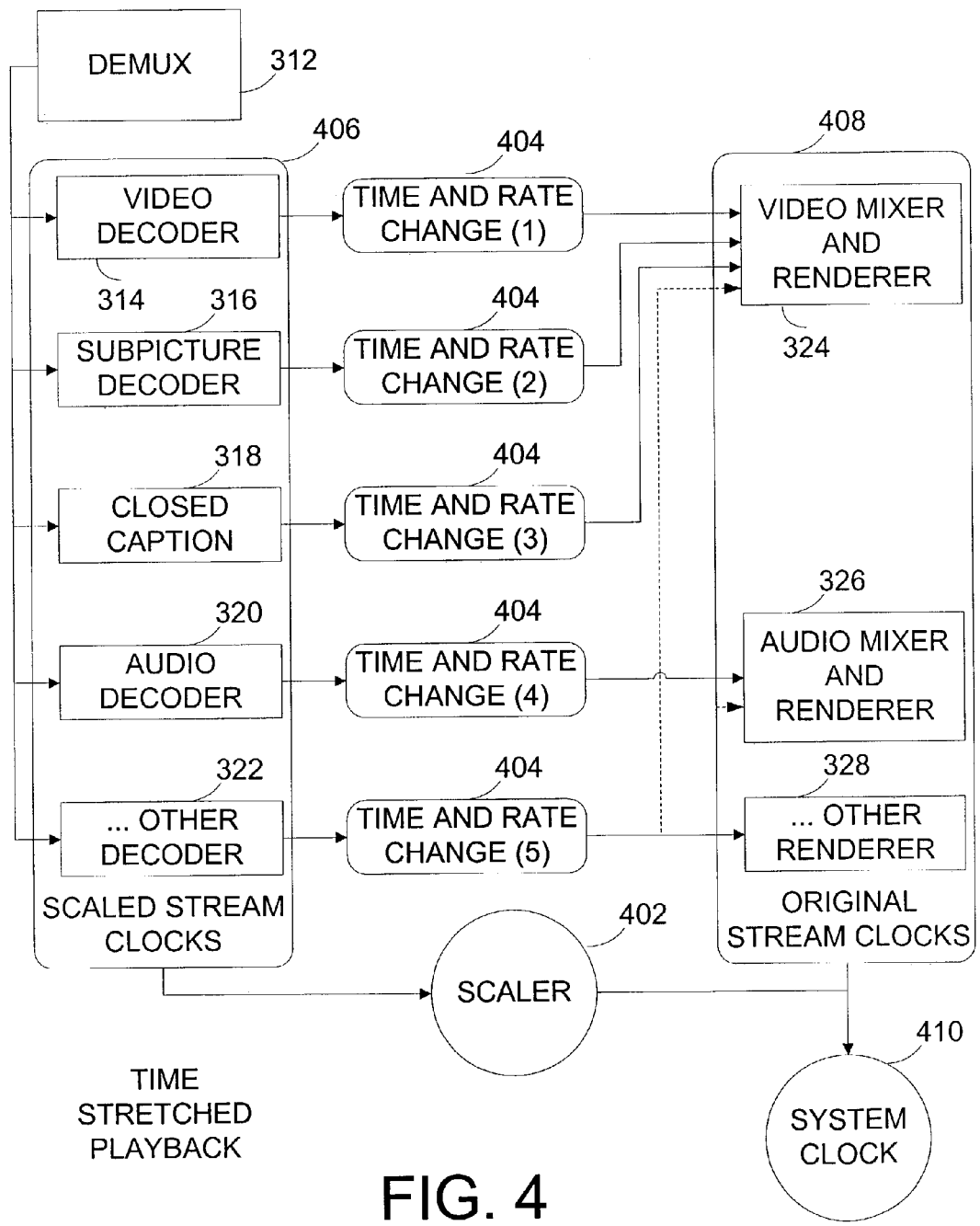
FIG. 4 illustrates a time-stretched playback diagram.

FIG. 4 illustrates a time-stretched playback diagram according to one implementation. To include time stretching to the apparatus illustrated in FIG. 3, the decoder clocks can be scaled by a scaler 402, and a time/rate change unit 404 can be disposed in the data path between the original decoders 406 and the mixer/renderer 408 to preserve the appropriate display rate. The time/rate change unit can be implemented in different methods depending on the particular elementary stream. By combining the clocks and scaling them simultaneously, proper synchronization or lip-sync with regards to the presented data can be achieved as illustrated by the scaler 402 and a system clock 410.

In one embodiment, the decoder clocks are related to decoding time stamps and/or presentation time stamps that are provided in the data stream. The system clock 410 can be related to a system clock reference (SCR), which is a time stamp for a reference clock that is embedded into the bit stream by the encoder.

It will be understood that a video decoder can be provided with fewer than all of the decoders 314, 316, 318, 320, 322 illustrated in FIGS. 3 and 4. For example, in another embodiment, only the video decoder 314 and the audio decoder 320 are present or activated, and the other decoders are optional. It will be understood that a number of variations are possible.

Time stretching can be used to alter the rate of multimedia playback while maintaining the semblance of proper audio pitch and synchronization, such that the pitch sounds unaltered. In one embodiment, time stretching can be accomplished by adding or by removing audio samples while maintaining the same audio clock. In one example using DVD playback, a 48 kHz clock is used for decoded audio samples and either a NTSC or PAL clock (27 MHz, broken into approximately 30 frames per second or 25 frames per second, respectively) is used for decoded video samples.

The audio samples can be decoded from compressed data. It will be understood that the decoded audio samples can correspond to discrete time samples of data in a pulse code modulation (PCM) format. The decoded audio samples can correspond to signed or unsigned values and to a variety of resolutions, such as to 8 bit and to 16 bit resolutions. In one example, the decoded audio data is presented in 16-bit signed form, with audio samples provided in discrete time intervals at the inverse of 48 kHz, i.e., about 20.83 microsecond discrete time intervals. These audio samples can be provided as an input to a digital to analog converter at the sampling rate.

It will be understood that multiple audio channels can be present. Multiple audio channels can be present for commentary tracks, foreign languages, multi-channel sound, etc. In addition, it will be understood that for audio data, a "frame" of audio data refers to audio data for a period of time corresponding to an inverse of the frame rate to which the audio data is synchronized. In the case of DVD, both the audio and the video clocks can be phase locked to each other (or to a master clock) to avoid audio/video drift. It will be understood that time stretching can be applied to other multimedia formats, such as VCD, QuickTime, AVI, and the like.

In the case of subpicture decoding and closed caption decoding, the resulting pixel images from these decoders at scaled time can be blended as necessary by the video mixer with the motion video before final display. Since subpictures and closed captions are typically static progressive images without continuous motion, precise frame rate conversion need not be used.

The system-wide scaling illustrated in FIG. 4 of the decoder clocks advantageously permits standard presentation time stamp (PTS) synchronization between the various decoders, including audio and visual decoders. This synchronization, combined with decoder time/rate conversion techniques (audio, video, subpicture, closed caption, and so forth), advantageously permits time-stretched multimedia stream presentation.

Figure 5A:
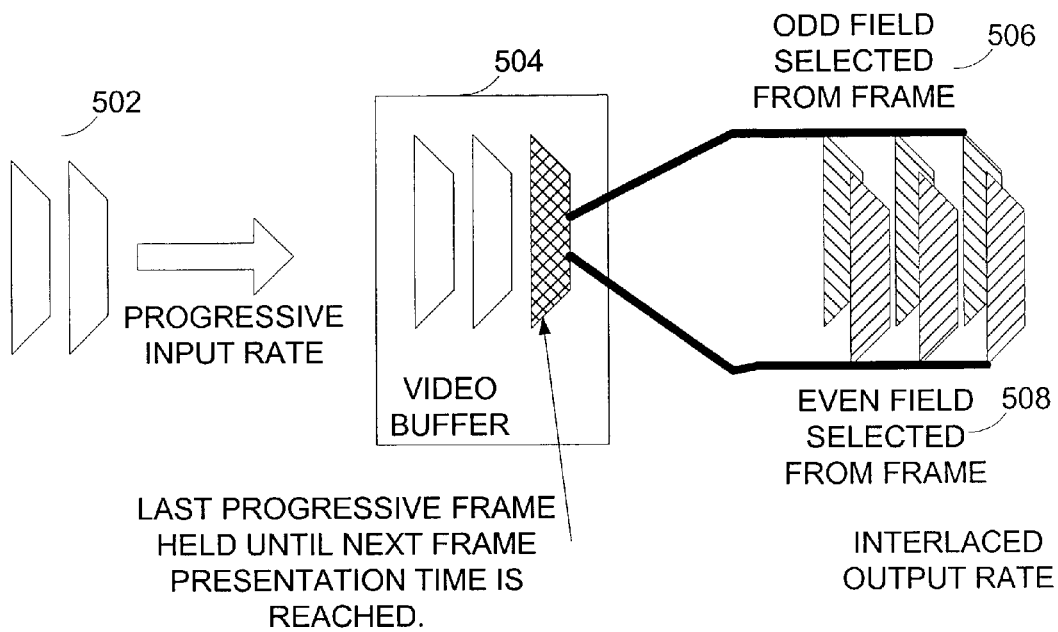
FIG. 5A illustrates presenting of interlaced video frames.

FIG. 5A illustrates presenting of interlaced video frames. Changing the frame rate for video frames is described in connection with FIGS. 5A, 5B, and 6. Video frames can correspond to progressive display and to interlaced display. Interlaced displays are typically used in television. It will be understood by one of ordinary skill in the art that some television standards, such as HDTV, can use progressive display and that some NTSC television sets are also capable of handling progressive video. With interlaced video, each vertical refresh updates alternate video lines; even lines in one vertical refresh and odd lines in another vertical refresh. The even lines together are called the even field, and the odd lines together are called the odd field. The even and odd interlaced fields combine to produce an interlaced frame.

For a progressive display, which is typically used in a computer monitor, each vertical refresh of the screen updates all the video lines. The video data in each vertical refresh of progressive display is called a progressive frame.

In addition, there are multiple sources for a video source: one is a progressive source, which is common for films and movies, where each frame is "snapshot" at different times; and another is an interlaced video source, which is common for television, where each field of each frame is "snapshot" at different times. There are other sources, such as computer generated sources, which can correspond to either progressive sources or to interlaced sources. A typical film source is progressive at 24 frames per second. An NTSC television source is interlaced at about 60 fields per second (or about 30 interlaced frames per second).

One embodiment of a frame rate conversion technique for an interlaced source material first converts the interlaced source material to a progressive source. Each interlaced field is converted to a frame by adding the odd lines to the even field or by adding the even lines to the odd field. This procedure is known as deinterlacing. The procedure of this can be established where the alternating lines are obtained through an interpolating filter of adjacent lines or through a median filter of adjacent lines of the current field (and previous fields). Hence, the deinterlacing of an interlaced source results in a progressive source with twice the original input frame rate. The subsequent discussions will be described in connection with a progressive input source.

It will be understood that deinterlacing can be used to convert an interlaced source into a progressive source. In a television environment with interlaced display, the display of these frames can be timed to extract the proper field from the input progressive frame as illustrated in FIG. 5A. For example, decoded frames 502 can be provided to a video buffer 504, which can be used to effectively change the frame rate. The video buffer 504 can be used to hold video frames, from which even and odd fields can be extracted. The fields of the video buffer 504 can be selectively repeated or deleted to effectively change the frame rate. The video buffer 504 provides odd video fields 506 and even video fields 508 as an output.

Figure 5B:
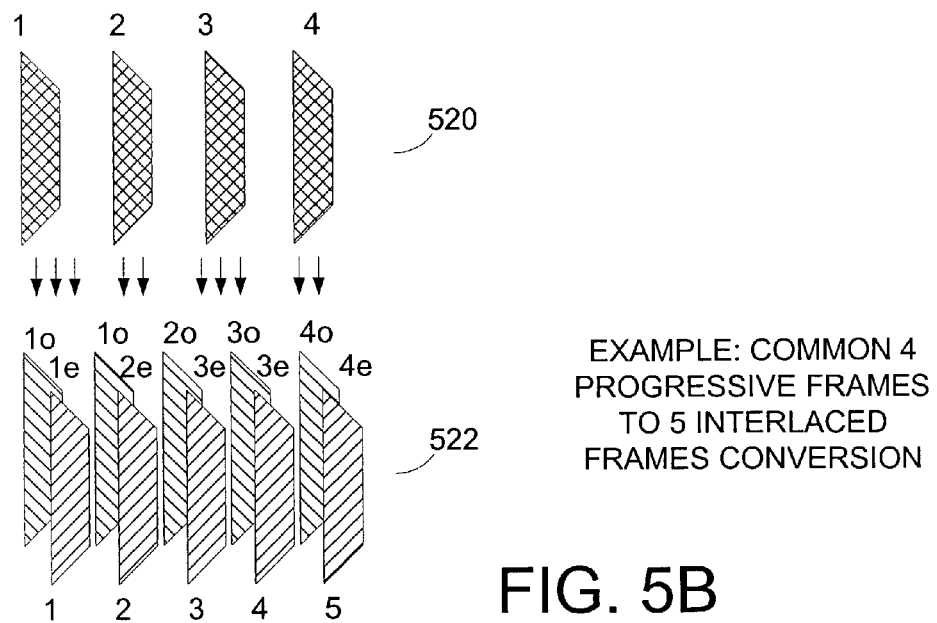
FIG. 5B illustrates an example of telecine conversion.

FIG. 5B illustrates an example of telecine conversion. One example of the common 4 input progressive frame to 5 output interlaced frame conversion, sometimes called telecine conversion, which converts 24 frame per second (fps) movies 520 to 30 fps NTSC video 522.

Figure 6:
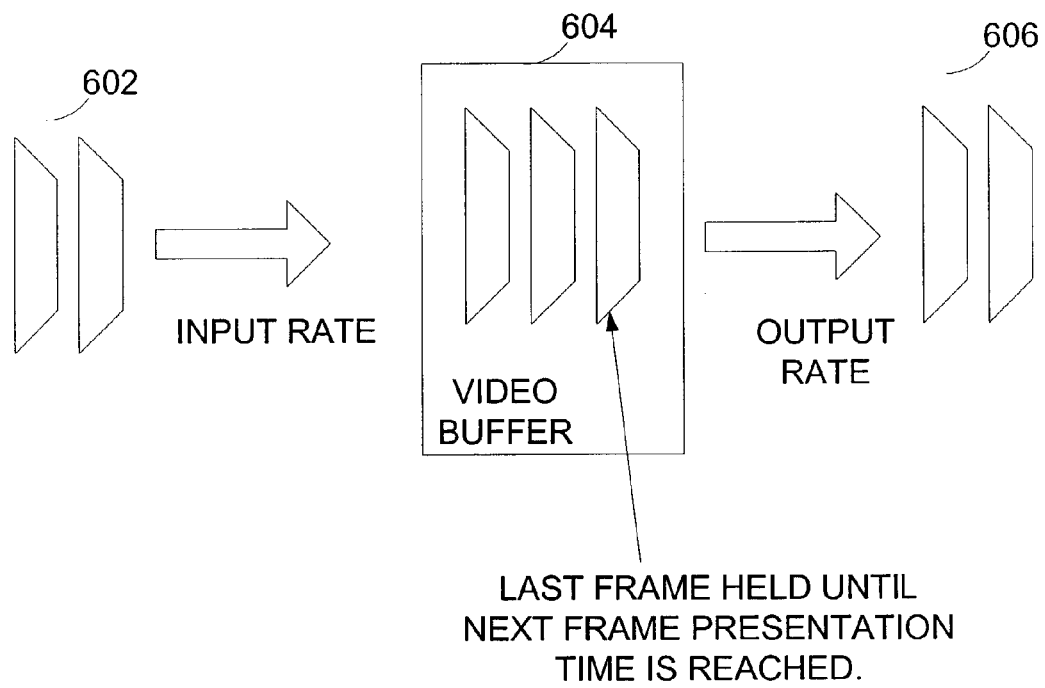
FIG. 6 illustrates presenting progressive video frames.

FIG. 6 illustrates presenting progressive video frames. In a computer environment, such as a laptop computer or a desktop computer with a progressive display device, where the video decoder is implemented in software, one method for changing the frame rate is to change the presentation time of the frames, resulting in an increase or decrease in the frequency of the Overlay Flip calls or the frame rendering calls. Selected frames can be repeated and selected frames can be skipped, depending on whether the vertical refresh rate is less than or greater than the desired display rate, respectively. For example, decoded frames 602 can be provided to a video buffer 604, which can be used to effectively change the frame rate. The video buffer 604 can be used to hold video frames, which can be selectively repeated or deleted to effectively change the frame rate. The video buffer 604 provides video frames 606 as an output.

FIG. 7A illustrates an example of waveforms in time stretching. In one embodiment, the time stretching is advantageously performed in real time. In the illustrated example, samples of the decoded audio are copied, i.e., increased in number, such that the decoded audio is slowed down to match with a reduced frame rate for the video. It will be understood that time stretching can also correspond to deleting of decoded audio samples to speed up the decoded audio for increased effective frame rates.

In the example time-stretching process, the process adds or removes the number of samples from an audio input buffer to an output buffer to advantageously adjust the frame rate of audio without audibly impacting the pitch of the audio. In the example illustrated in FIG. 7A, input audio samples are received in groups of X (a frame size of X) and output audio samples are delivered with a frame size of Y per iteration. The time-stretch factor $\alpha$ can be expressed by Equation 1.

$$a = Y/X \qquad \text{(Eq. 1)}$$

In the upper graph of FIG. 7A, the input data is provided in an audio frame size of X samples. From the input data, different segments S, (indicated by $S_0$ through $S_2$), are extracted to form the output samples. Segment $S_0$ starts at point $X_0=0$. Segment $S_1$ starts at a point $X_1$. Segment $S_2$ starts at a point $X_2$. One method of obtaining the locations $X_1$ and $X_2$ and a search region R will be discussed later. The minimum length of each segment S is related to and can be proportional to the maximum time-stretch expansion desired. In one embodiment, the minimum length of each segment is directly proportional to the maximum time-stretch desired. For example, in order to double the number of audio samples (a time-stretch factor of 2), the length of S should be at least twice that of the input audio frame size X. In one embodiment, the length of S is fixed for a given time stretch factor.

The middle graph of FIG. 7A illustrates an example of reconstruction of the output samples. In the reconstruction, the segments $S_0$ through $S_2$ are offset from each other by an output frame size of Y samples. The overlapping portions of the segments can advantageously be matched with a pitch period of the input waveform. For example, men typically have a lower pitched voice (about 1 kHz) than women (about 1.5 kHz). These voice pitches can correspond to the natural pitch of the input waveform.

The lower graph of FIG. 7A illustrates combining of segments. The segments $S_0$ and $S_2$ are combined to form the output waveform. The samples that do not overlap for the segments can be copied to the output buffer. The samples that do overlap for the segments are treated differently. For the overlapping region $O_1$ between $S_0$ and $S_1$, samples can be taken from $S_0$, or from $S_1$, or from a weighted average between $S_0$ and $S_1$. In one embodiment, a linear windowing function is used to weigh the average between the samples in $S_0$ and $S_1$ for the overlapped region $O_1$. Since windowing between $S_0$ and $S_1$ can be computationally intensive, one embodiment uses samples from $S_0$ or $S_1$ when execution time becomes relatively slow due to slow processor speed or due to processor load sharing and the like. These techniques can be applied to other overlapping portions between segments.

The segment positions are preferably taken from the input waveforms so that when they are offset by the output data frame sizes Y, the waveforms match up relatively well. This is illustrated in the middle and the lower graphs of FIG. 7A, where the pitch periods are appropriately aligned in the overlapping regions $O_1$ and $O_2$.

Appropriate alignment determines the segment start positions $X_1$ and $X_2$ (note that $X_0=0$) from the input buffer. As illustrated in the upper graph of FIG. 7A, these points $X_1$ and $X_2$ lie within a search region R around X or 2X, respectively.

FIG. 7A illustrates an example of time stretching used in connection with adding audio samples. FIG. 7B illustrates a similar example, but where audio samples are removed such that the number of input samples is greater than the number of output samples, i.e., X>Y.

In one embodiment, one goal of determining the segment $S_n$ start position is to find an appropriate offset within the search region R of n·X which appropriately matches the previous segment $S_{n-1}$ offset by Y samples. The match can be determined by a variety of techniques, such as by substantially maximizing cross-correlation or by substantially minimizing the error measure in the region of $O_1$. The correlation between two offsets in the sample array $d_1$ and $d_2$ is provided in Equation 2.

$$C(x, d_1, d_2, l) = \sum_{i=0}^{l} x[i+d_1] \cdot x[i+d_2] \quad \text{(Eq. 2)}$$

In Equation 2, x is the input sample array, and the length parameter l of the correlation can be the size of the overlap region $O_n$. A relatively good match position $X_n$ for n-th segment $S_n$ is given as a point of relatively high correlation C through the search range. This concept is expressed in Equation 3a to 3c.

$$X_n = r \quad \text{(Eq. 3a)}$$

such that $$n*X-R/2 <= r <= n*X+R/2 \quad \text{(Eq. 3b)}$$

and $$C(x, X_{n-1}+Y, r, l) \quad \text{(Eq. 3c)}$$

is substantially maximized.

It will be understood that other error measures, such as absolute difference or squared error, can also be used. For example, a squared error measure D as expressed in Equation 4 can be used.

$$D(x, d_1, d_2, l) = \sum_{i=0}^{l} (x[i+d_1] - x[i+d_2])^2. \quad \text{(Eq. 4)}$$

With Equation 4, a relatively good correlation exists when the error difference D is relatively small as expressed in Equations 5a, 5b, and 4.

$$X_n = r \quad \text{(Eq. 5a)}$$

such that $$n*X-R/2 <= r <= n*X+R/2 \quad \text{(Eq. 5b)}$$

and $$D(x, X_{n-1}+Y, r, l) \quad \text{(from Eq. 4)}$$

is substantially minimized.

In one embodiment, subsampling techniques are advantageously used to reduce the computational complexity of the time-stretching process. Audio typically has most of its energy in the relatively low frequency bands under about 4 kHz. As a result, one embodiment advantageously uses subsampling or decimatation techniques to reduce the number of samples used in the audio correlation search for time stretching in a section. For example, with a subsampling of two, the correlation does not consider every sample in the overlap $O_1$ of the two segments $S_0$ and $S_1$, but rather, considers every other audio sample. This advantageously reduces the number of computations for $C(x, d_1, d_2, l)$ or for $D(x, d_1, d_2, l)$. Other correlation subsampling rates will be readily determined by one of ordinary skill in the art.

In addition, this low-energy characteristic of audio also permits one embodiment to reduce the number of positions in the search for relatively high correlation. For example, when searching for $X_n$, the values for r need not be every sample position between $n*X-R/2 <= r <= n*X+R/2$, but, for example, only the even numbered positions. Once a relatively good position is found within, for example, the even numbered positions, a more precise search can be performed for the nearby odd positions to potentially locate an even better position. This can be performed with progressively finer resolutions in a multi-resolution manner by using multi-pass search.

One example of a process that uses three passes is described as follows. The first search can be performed at every $4^{th}$ position on the search range using a correlation subsampling of 8. After finding relatively good correlation, the search can proceed at a local region at every $2^{nd}$ position with a correlation subsampling of 4. Then, the search can proceed at the local region around that position using every position and every audio sample.

In one embodiment, the process inspects every $4^{th}$ position on the search range using a correlation subsampling of 8, and then checks only the nearby 3 positions on either side of the position found using a correlation subsampling of 8. In one embodiment, filtering and reduced precision input data can be used to reduce the effects of noise on the subsampled search. The search range R can vary depending on the detected pitch periods as well as the input frame size X.

For multiple channels, one embodiment uses the same segment offsets for each channel to avoid phase shifting among channels. The contributions to the correlation can be equally weighed among all of the channels, can be computed from less than all of the channels and applied, or can be computed from combinations of the channels. For example, in the case of stereo, a position can be found that substantially maximizes the sum of correlations of both the left and right the channels at that position. In one embodiment, with more channels, the rear (surround) channels may be excluded from the correlation computation for simplicity.

In one embodiment, the time-stretch techniques are applied only within a selected range of speeds. For example, when audio is sped up or slowed down too much, the audio can become unintelligible. In one embodiment, the time-stretch techniques are disabled, muted, or not computed when the desired frame rates exceed a predetermined range. One example of a predetermined range is 0.5× to 2.0×, where 1× corresponds to an original speed.

Other techniques may be used to a change an audio playback rate without a change in pitch. See "The intelligibility of interrupted speech" by G. A. Miller et al., in Journal of the Acoustic Society of America, 22(2): 167-173, 1950; "Note on pitch-synchronous processing of speech" by E. E. David and H. S. McDonald in Journal of the Acoustic Society of America, 28(7): 1261-1266, 1965; "Speech compression by computer" by S. U. H. Quereshi in Time-Compressed Speech, pp. 618-623, S. Duker, ed., Scarecrow, 1974; "Simple pitch-dependent algorithm for high quality speech rate changing" by E. P. Neuberg, Journal of the Acoustic Society of America, 63(2):624-625, 1978; "High quality time-scale modification for speech" by S. Roucos and A. M. Wilgus, Proceedings of the International Conference on Acoustics, Speech, and Signal Processing, pp. 493-496, IEEE, 1985; and "Real-time time-scale modification of speech via the synchronized overlap-add algorithm" by D. J. Hejna, Jr., Master's thesis, Massachusetts Institute of Technology, February 1990, Department of Electrical Engineering and Computer Science.

The time-stretch factor $\alpha$ that is used can be provided in a variety of ways. For example, a user may enter the desired time-stretch factor $\alpha$ directly via a user interface. In another example, a user can enter another parameter, such as a time by which completed playback is desired, and the user interface or the decoder can calculate an appropriate time-stretch factor α. In another example, the time-stretch factor α is automatically calculated in response to buffer occupancy levels, to battery charge levels, and the like.

Figure 7C:
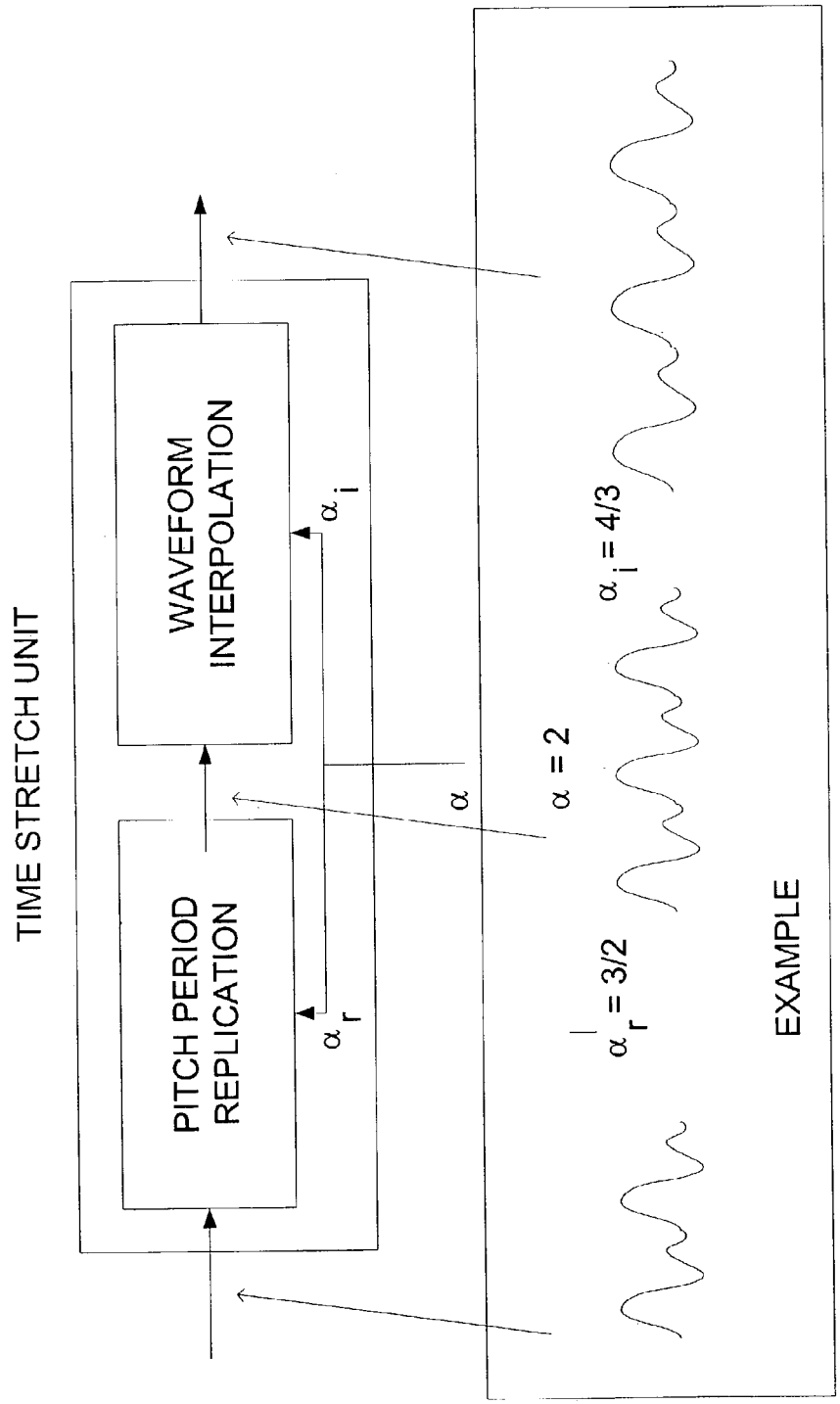
FIG. 7C illustrates a block diagram of time-stretching with a controlled pitch change.
Figure 7D:
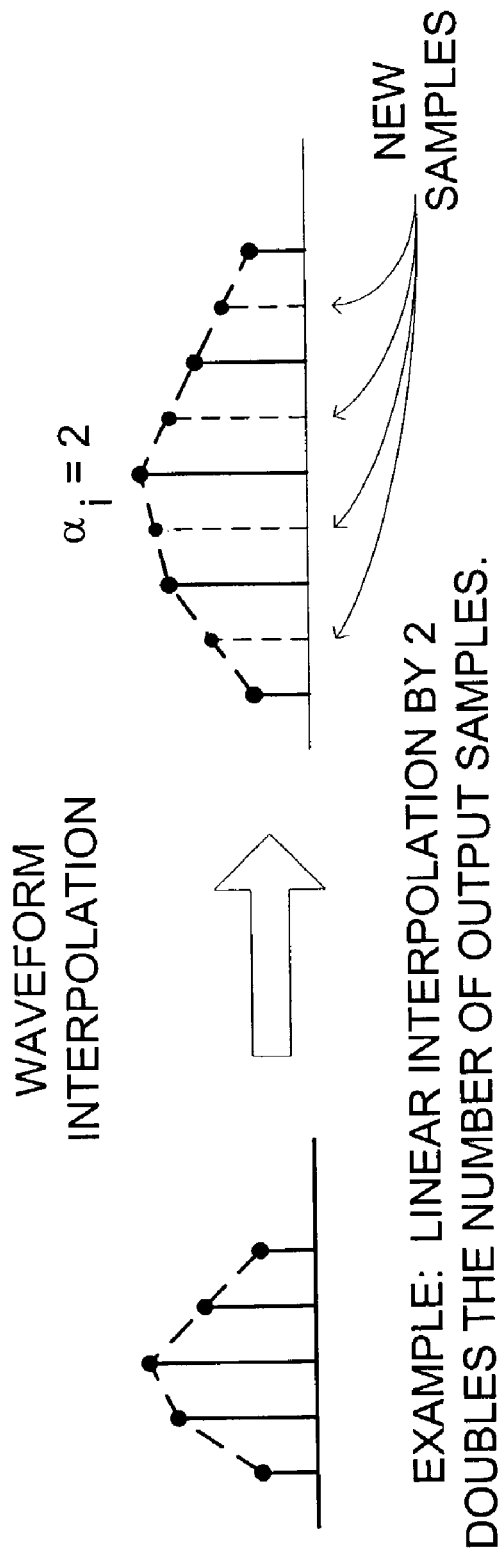
FIG. 7D illustrates an example of waveform interpolation.

The time-stretch can incorporate full pitch control as illustrated in FIG. 7C. The time-stretch factor α can be decomposed into a pitch period replication factor $\alpha_r$ through the method described above and a waveform interpolation factor $\alpha_i$, which controls the pitch shift. As described earlier in connection with Equation 1, the waveform interpolation factor, $\alpha_i$, is the ratio of the output number of samples to the input number of samples to the waveform interpolator. Waveform interpolation as described herein can include both interpolation and decimation of the input samples. Waveform interpolation methods are well known in digital signal processing literature: common methods include linear interpolation, cubic spline interpolation, windowed sine interpolation and decimation, and so forth. An example of interpolation is illustrated in FIG. 7D, where new output samples are derived from the linear interpolation of the original input samples.

In one embodiment, the overall time-stretch factor α corresponds to the product of the pitch period replication factor and the waveform interpolation factor:

$$\alpha = \alpha_r \cdot \alpha_i \qquad (Eq.\ 5c)$$

When $\alpha_i$ is set to 1 or close to 1, the audio playback rate does not change pitch and $\alpha = \alpha_r$. When $\alpha_i$ is not equal to 1, then there is a pitch shift where the frequency change is controlled by $\alpha_i$. A larger value for $\alpha_i$ corresponds to a decrease in pitch frequency, and a smaller value for $\alpha_i$ corresponds to an increase in pitch frequency. In one configuration, the values for $\alpha_i$ can be set to 1 or set relatively close to 1. In one embodiment, the value for the waveform interpolation factor $\alpha_i$ varies in a range from about 1 to about the inverse of the pitch period replication factor $\alpha_r^{-1}$. It will be understood by the skilled practitioner that the embodiments can be modified in a variety of ways to control the pitch by modifying $\alpha_i$ without departing from the spirit and scope of the invention.

Figure 8:
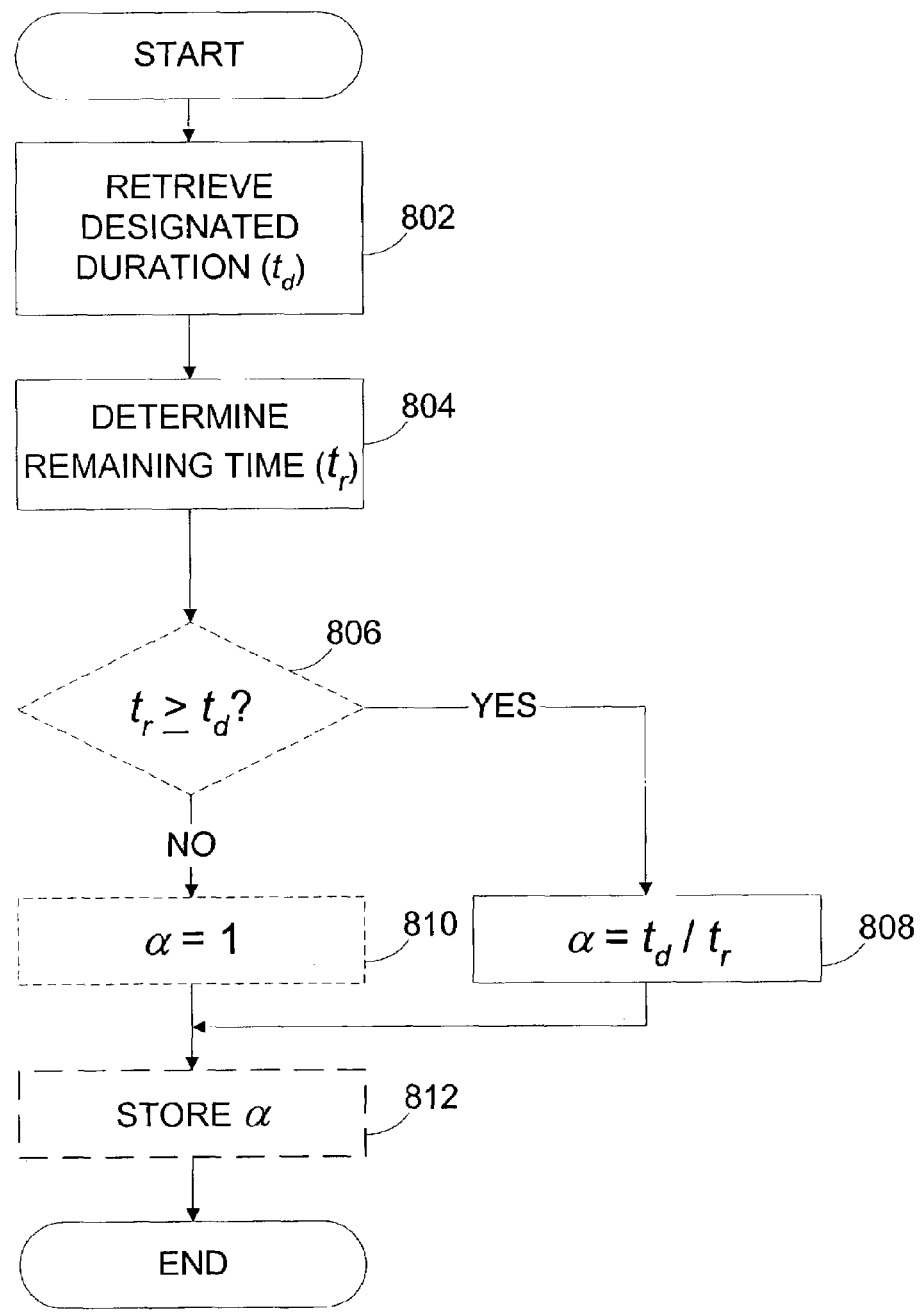
FIG. 8 generally illustrates a process for a "play in" time.

FIG. 8 generally illustrates a process that can be used for a "play in" time. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process can be implemented by software or can be performed in dedicated hardware. The process begins at a state 802, where the process receives an indication of a selected amount of time or selected duration $t_d$. For example, the selected amount of time can be provided from a user interface. For example, the user interface can allow the user to enter a number for the duration, to manipulate a bar or slider, to manipulate buttons that increment or decrement the duration, and the like. In another example, the selected amount of time is calculated from other values, such as from a battery charge level. The process advances from the state 802 to a state 804.

In the state 804, the process determines the amount of remaining time $t_r$ in the media presentation for playback at normal speed or at standard frame rates, i.e., a speed of 1×. It will be understood that where playback of the media presentation has yet to commence, the remaining time $t_r$ can correspond to the run time of the media presentation. The process can advance from the state 804 to an optional decision block 806. Where the optional decision block 806 is not present or is not enabled, the process advances from the state 804 to a state 808.

In the optional decision block 806, the process evaluates whether the remaining time $t_r$ is greater than or equal to the selected duration $t_d$. The time-stretching techniques need not be used to complete presentation of the multimedia presentation when there is sufficient time selected for the selected duration $t_d$. In one embodiment, the process detects this and proceeds to time stretching when time-stretching is needed to complete the presentation of the multimedia presentation in the selected duration $t_d$ by proceeding to the state 808. Of course, it will be understood that a user can also use the time-stretching technology to slow down the media presentation for other purposes, such as, to learn a foreign language. In this case, the optional decision block 806 can be disabled or can be modified to include a pop-up window to verify desired entry of time duration, etc. In one embodiment, when there is sufficient time in the selected duration $t_d$ without time stretching, the process proceeds from the optional decision block 806 to an optional state 810.

In the state 808, the process computes an appropriate value for the time-stretch factor α. For example, the time-stretch factor α can be computed by Equation 6. The process can advance from the state 808 to an optional state 812, or the process can end.

$$\alpha = \frac{t_d}{t_r} \qquad (Eq.\ 6)$$

In the optional state 810, the process resets the time-stretch factor α to a value of 1, thereby disabling the time-stretching operation. In another embodiment, a flag can be set to indicate disabling. The process advances from the optional state 810 to the optional state 812.

In the optional state 812, the process stores the value of the time-stretch factor α. The time-stretch factor α can be used to determine the relationship between an original frame rate of the multimedia presentation and an effective frame rate. In one embodiment, the effective frame rate is the original frame rate divided by the time-stretch factor α. The value can be stored to permit the system to be able to return to a prior time-stretch factor α after another activity, such as after a pause command.

Figure 9:
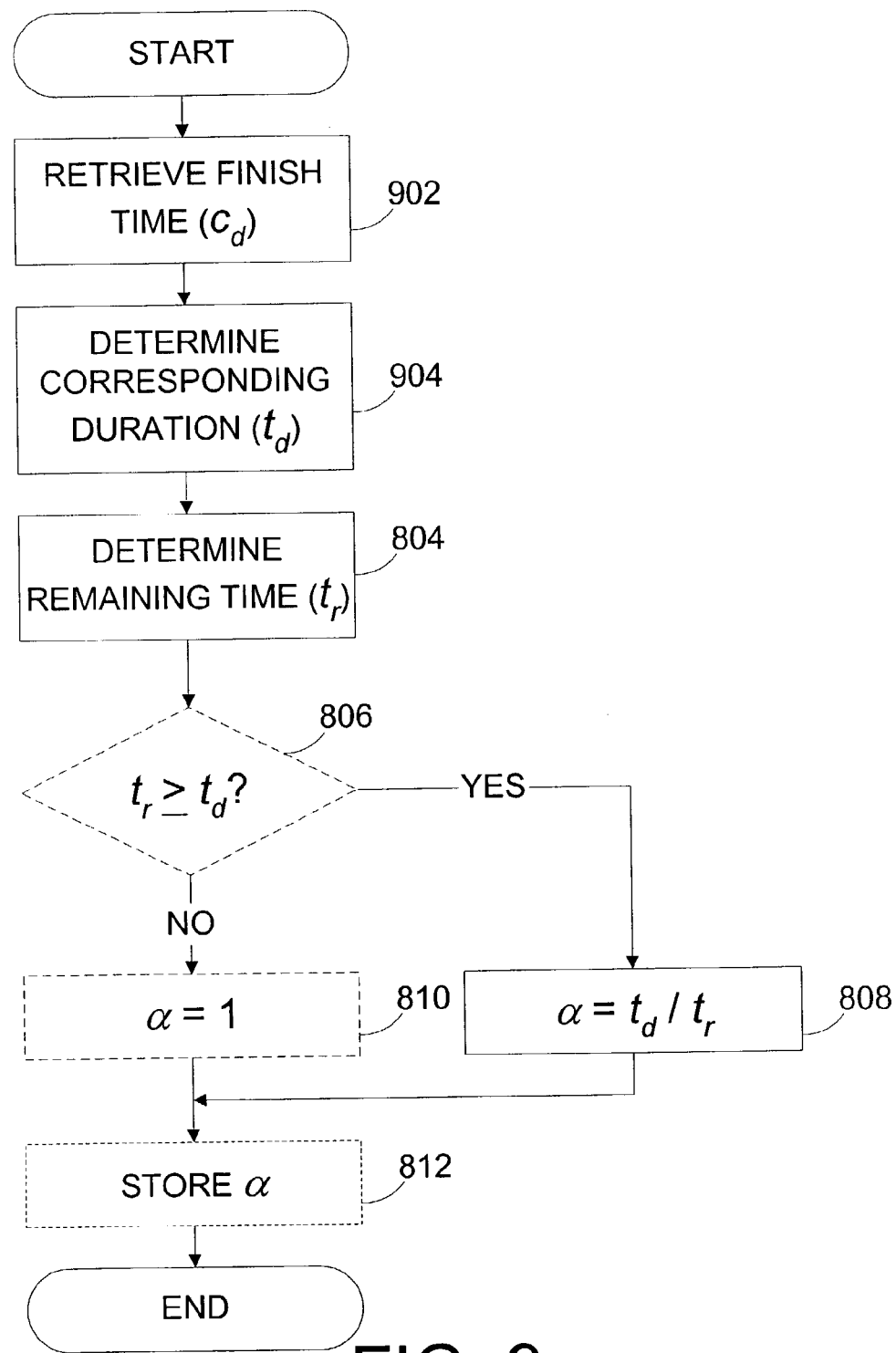
FIG. 9 generally illustrates a process for a "finish by" time.

FIG. 9 generally illustrates a process for a "finish by" of "finish at" time. This can advantageously be used to, for example, display a media presentation within an allotted time for a class or within the time of a relatively short flight. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The illustrated process can advantageously be used to set a time by which the playback of the multimedia presentation is to be completed.

The process begins at a state 902. In the state 902, the process retrieves a finish time $c_d$, that is desired. In one embodiment, the finish time is retrieved from a user interface. For example, the finish time can correspond to a time, such as an hour and a minute, e.g., "10:00 PM," by which completion of playback of the multimedia presentation is desired. The process advances from the state 902 to a state 904.

In the state 904, the process computes the duration $t_d$ or time interval between the present time and the finish time $c_d$. The duration $t_d$ can then be provided as an input to the states and/or decision blocks 804, 806, 808, 810, 812 of the process described earlier in connection with FIG. 8 to compute an appropriate time-stretch factor α and/or appropriate effective frame rates for the time-stretched presentation. In one embodiment, the process further adaptively recalculates the time-stretch factor in response to navigation commands, such as in response to a pause in the presentation.

Figure 10:
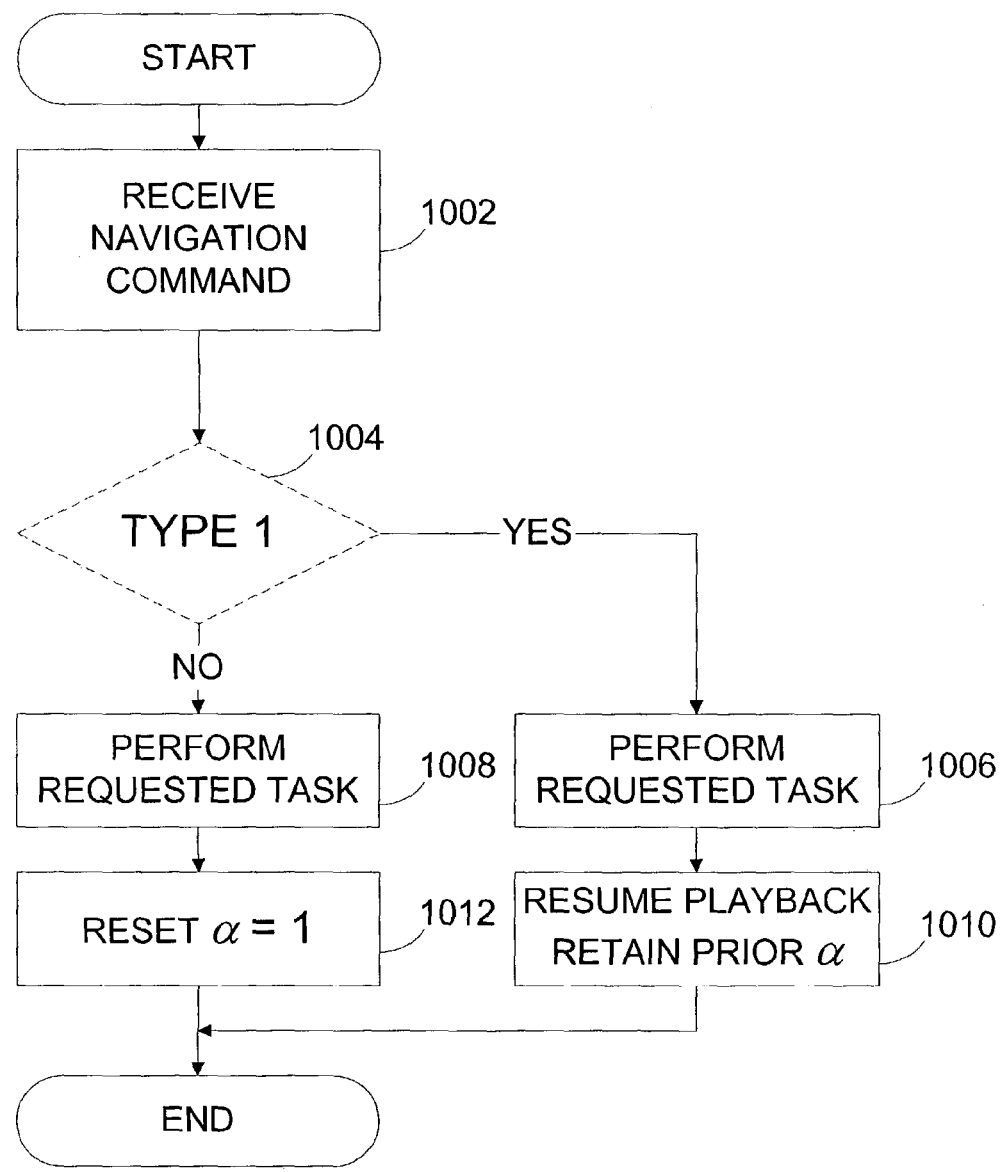
FIG. 10 generally illustrates a process for a navigation command.

FIG. 10 generally illustrates a process for a navigation command. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

The process begins at a state 1002. In the state, the process receives a navigation command. For example, the navigation command can correspond to commands such as seek, skip, fast forward, rewind, stop, change media selection, pause, and slow motion. It will be understood that a seek command can correspond to a skip (chapter change, jump to time), to a time search (such as fast forward), or to both. The process can advance from the state 1002 to an optional decision block 1004. Where the optional decision block 1004 is not present or is not enabled, the process can advance from the state 1002 to a state 1006.

In the optional decision block 1004, the process characterizes the type of navigation. For example, selected navigation commands can be configured to reuse a previously selected time-stretch factor α and others can be configured to reset the time-stretch factor α. For example, in one embodiment, the navigation commands that reuse a previously selected time-stretch factor α include commands such as seek commands, fast forward commands, rewind commands, pause commands, scan speed commands, and the like. In one embodiment, the navigation commands that reset the time-stretch factor α include stop commands and change of media commands, such as the selection of a different media presentation. It will be understood that other groupings are possible. In one embodiment, the groupings are configurable. The process proceeds from the optional decision block 1004 to the state 1006 when the time-stretch factor α is to be reused. Otherwise, the process proceeds from the optional decision block 1004 to a state 1008.

In the state 1006, the process performs the task corresponding to the navigation command. When the task is complete, the process advances from the state 1006 to a state 1010.

In the state 1010, the process resumes playback of the media presentation with time stretching enabled. For example, the process can be configured to reuse a prior time-stretch factor α as illustrated. In another example, the process adaptively recalculates the time-stretch factor α based on, for example, a remaining battery level versus remaining amount of media presentation, etc. The process then ends and can be repeated as desired.

Returning now to the state 1008, the process performs the requested task. When the task is complete, the process advances from the state 1008 to a state 1012, where the time-stretch factor α is reset or time stretching is disabled. The process then ends.

Figure 11:
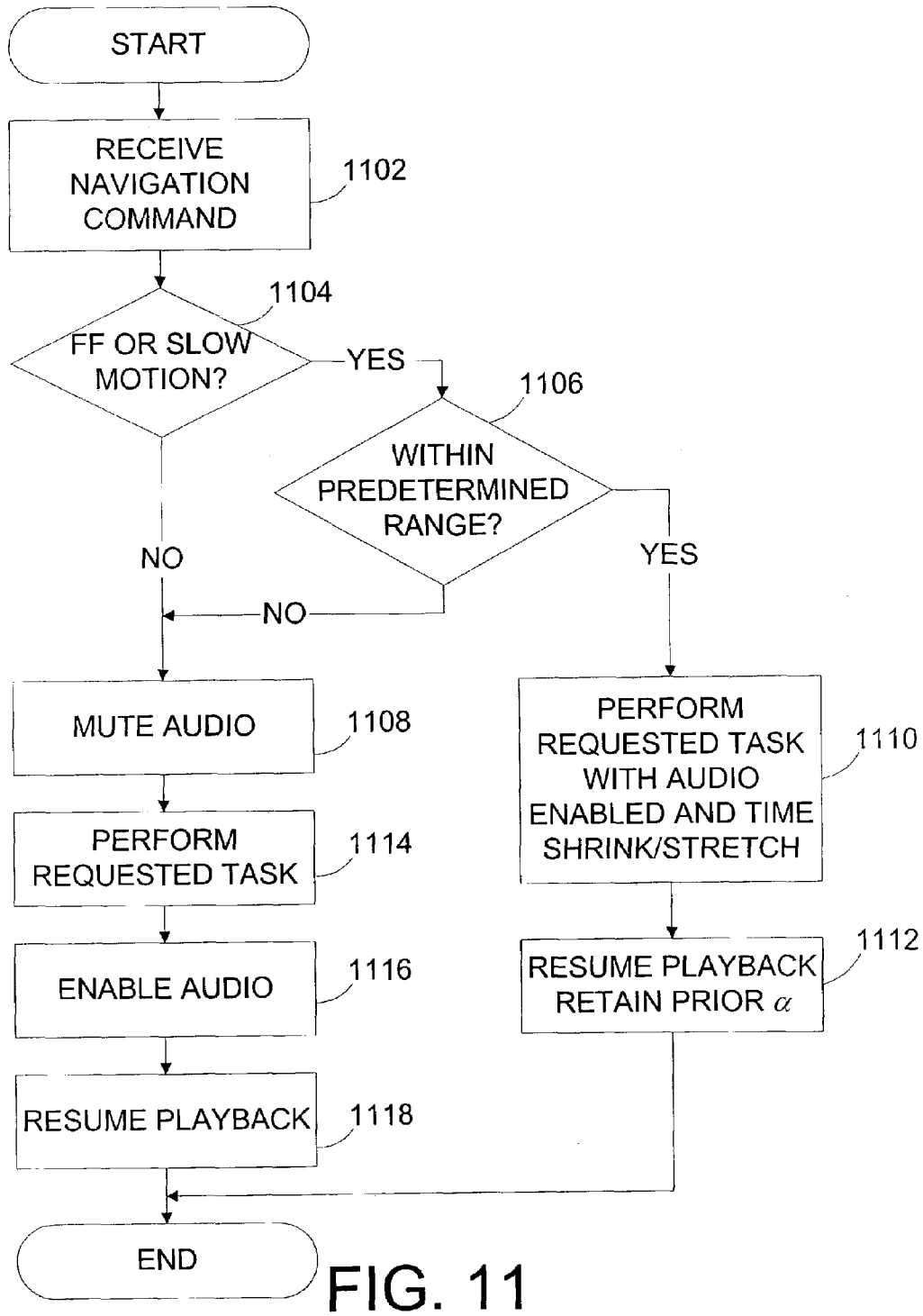
FIG. 11 generally illustrates a process for a navigation command.

FIG. 11 generally illustrates a process for a navigation command. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

The process begins at a state 1102, where the process receives a navigation command. The process advances from the state 1102 to a decision block 1104. In the decision block 1104, the process determines whether the command corresponds to fast forward and/or to slow motion. If so, the process proceeds to a decision block 1106. Otherwise, the process proceeds to a state 1108.

In the decision block 1106, the process determines whether the selected fast forward or slow motion speed corresponds to a predetermined range. In one embodiment, this predetermined range corresponds to a range that is considered intelligible, such as between 0.5× and 2.0×. When the selected fast forward or slow motion speed is within this range, the process proceeds from the decision block 1106 to a state 1110. Otherwise, the process proceeds from the decision block 1106 to the state 1108.

In the state 1110, the process performs the selected fast forward or slow motion with audio enabled and with time stretching performed. This advantageously permits a user to listen to the corresponding audio, which is typically muted with these commands. This can greatly enhance the viewing experience. Although some conventional multimedia players, such as conventional DVD players, can play back audio during a fast forward scan, such as a 2× scan, these multimedia players play back unintelligently selected blocks of data, such as blocks of data selected only based on time. The playback of only unintelligently selected blocks of data, while simple to implement, does not result in intelligible play back of audio data and also results in relatively many objectionable clicks and pops. By contrast, embodiments of the invention advantageously identify segments within the audio data for similarities, and delete and/or copy these segments to speed up and/or to slow down audio for a multimedia presentation in an intelligible manner. The process advances from the state 1110 to a state 1112 when the command has been completed.

In the state 1112, the process resumes playback with the prior time-stretch factor α. In another embodiment, the process resets or disables the time-stretch factor α. In another embodiment, the time-stretching process can be used for fast forward or slow motion even when time stretching had not previously been selected. In another embodiment, the process can adaptively recalculate the time-stretch factor α. The process can then end.

Returning to the state 1108, the process mutes the audio. In another embodiment, instead of muting, the process can play back during the navigation command with a pitch change, with a decreased volume, with unintelligently selected audio samples, etc. The process advances from the state 1108 to the state 1114, where the process performs the requested task. The process advances from the state 1114 to a state 1116 after the requested task is completed. In the state 1116, the process enables the audio if the audio had been disabled or muted in the state 1108. The process then resumes playback as indicated in the state 1118.

Figure 12:
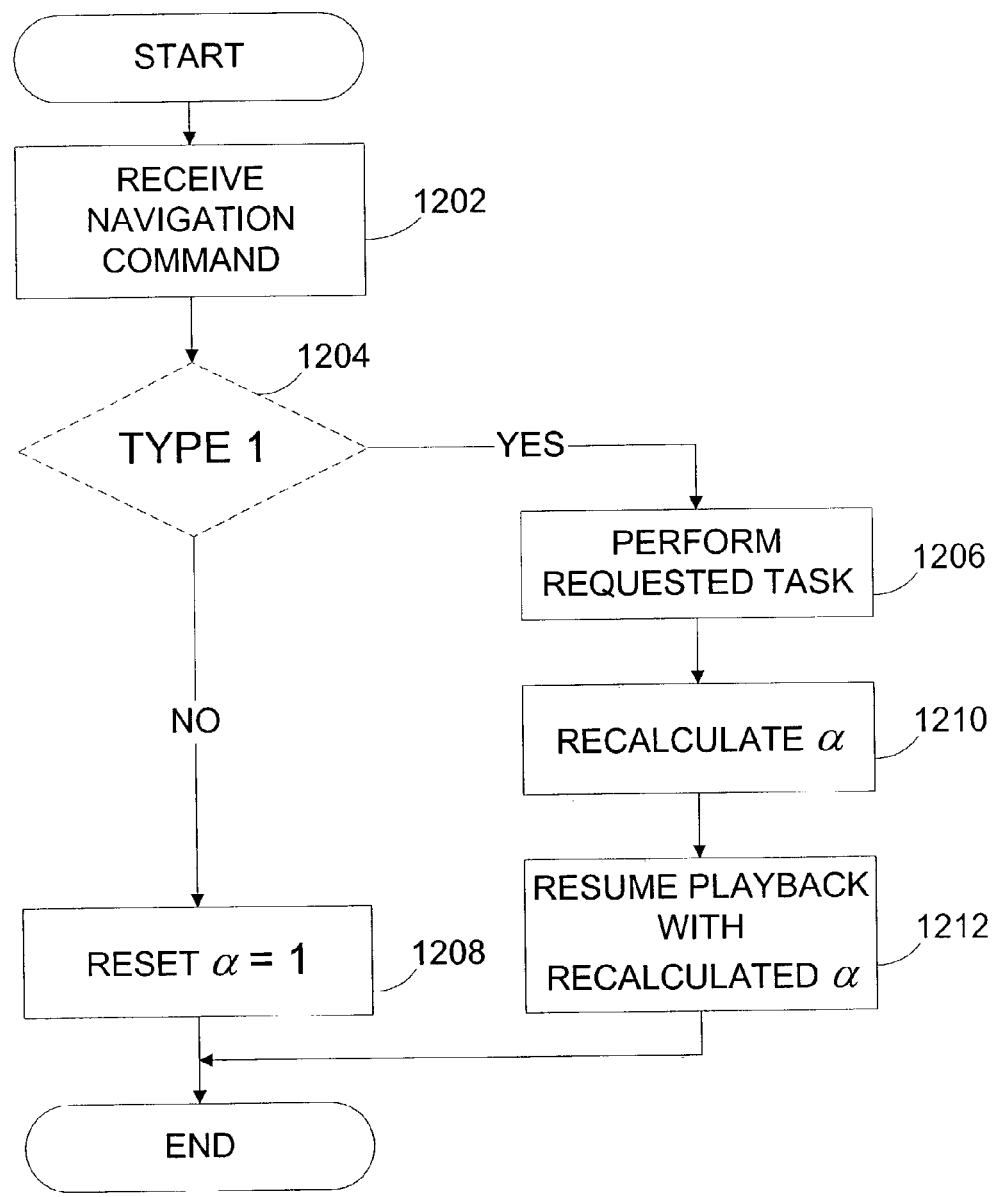
FIG. 12 generally illustrates a process for a navigation command.

FIG. 12 generally illustrates a process for a navigation command with adaptive recalculation. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

The process begins at a state 1202, where the navigation command is received. The process proceeds to an optional decision block 1204. The optional decision block 1204 permits selected navigation commands to be used in connection with the adaptive recalculation. For example, commands other than stop or change media presentation commands can be selected to indicate proceeding from the optional decision block 1204 to a state 1206. Otherwise, the process proceeds from the optional decision block 1204 to a state 1208, where the time-stretch factor α is reset and/or time-stretching is disabled.

In the state 1206, the process performs the requested task. When complete, the process advances to the state 1210. In the state 1210, the process adaptively recalculates the time-stretch factor α in response to, for example, a remaining amount of time, a remaining amount of battery charge, a buffer occupancy level, etc. The process advances from the state 1210 to a state 1212 to resume playback with the recalculated time-stretch factor α. In one embodiment, hysteresis is used so that the recalculated value for the time-stretch factor α is not changed too rapidly, which can be uncomfortable for some viewers. This can be implemented by, for example, changing the value for the time-stretch factor α only when the new value is different from the previous value by a predetermined amount, such as, for example, by at least 10%.

Time stretching can advantageously be applied to other applications. One example is with PAL or with SECAM. PAL and SECAM video standards, widely used in Europe and in France, respectively, use a frame rate of 25 frames per second (fps). This frame rate is relatively close to the frame rate of film, which is typically shot at 24 fps. When films are transferred to PAL or to SECAM video, the film is sped up to 25/24 of its intended speed, which is 1/24 or about 4% too fast. This disadvantageously results in films that play back too fast.

In one embodiment, the time stretching is used to slow down the effective frame rate of the video to the original film frame rate of 24 fps. The time stretching advantageously permits the audio to remain synchronized to the reduced frame rates while controlling the pitch to either maintain the same sounding pitch or to allow the pitch to decrease in a controlled manner. In one embodiment, the pitch is configured to decrease by about 4 percent. In one embodiment, the process performs the conversion of the 25 fps to 24 fps in response to a manual selection. In another embodiment, an original film source (as opposed to video source) is detected, and the 25 fps to 24 fps conversion is automatically selected.

A movie shot in film corresponds to a progressive source, whereas TV or video content typically corresponds to an interlaced source. For PAL or SECAM detection of movie content versus TV content, an interlaced content detector can be used. The interlaced source detection can advantageously be performed through analysis of the video stream when it is encoded by the MPEG video standard. The content can be encoded progressive on a picture level by the progressive_sequence and progressive_frame flags in the sequence extension and the picture extension headers, respectively. Furthermore, another indication that can be used to determine whether the source content is progressive is to detect if field-based encoding of macroblocks (field-based motion vectors or field-based DCT) has been used. An MPEG-2 picture is divided into smaller units known as macroblocks. It will be understood that in other video standards, such as MPEG-4, a picture can be further divided into other units, such as visual object planes (VOPs).

In another embodiment, an interlaced sequence can be detected based on whether there is significant video energy (or activity) in adjacent lines as compared to the overall video energy in the picture. The energy analysis can be performed through frequency band analysis, through transforms, through filter banks, through correlation detection, and the like. In one embodiment, a vertical filter of [−1 1 0] can be compared with a vertical filter of [−1 0 1] when applied to the video frame. If the former has larger energy than the latter, the content is likely to have been coded interlaced. For the energy measurements, it will be understood by one of ordinary skill in the art that many different measures and metrics can be used. For example, the sum of absolute value or squared value of the pixels after filtering can be used.

In another embodiment, the play-in time $t_d$ can be dynamically calculated or recalculated based on a feedback loop using selected environment variables; for example, time left for downloading content from the Internet or remaining power left in a battery operated device, such as a laptop. In one embodiment, the estimated playback time can be calculated by the current battery power divided by the battery drain as illustrated in Equation 7.

$$t_d = (\text{battery level/drain rate}) - \text{tolerance} \quad \text{(Eq. 7)}$$

For example, the battery level can be provided by an operating system, such as Microsoft Windows®. The battery level indicated by the operating can be used as an estimate of the remaining charge in the battery. In another embodiment, a hardware circuit can monitor a voltage of the battery, and an estimate can be calculated. The drain rate can be determined by monitoring the change in battery level over time. A tolerance can further be used to compensate for inaccuracies in the estimates and to provide some battery charge remaining at the end of the media presentation for a controlled power down. In this example, the tolerance is typically negative, so playback can be sped up to occur in a shorter amount of time than the discharge of the battery level. In one example, the tolerance corresponds to a value of about 5 minutes.

In another embodiment, time stretching is invoked and/or varied in response to a buffer occupancy level. For example, during the Internet streaming of a media presentation, it may be beneficial to use time stretching to compensate for network lag and buffer underflow. In one embodiment, the media presentation that is streamed from the Internet corresponds to a multimedia presentation with both visual images and audio. In another embodiment, the media presentation that is streamed from the Internet corresponds to an audio-only presentation.

In one example, time-stretching permits streamed multimedia content such as video to begin playback earlier than it otherwise would. Using time-stretching, playback can initiate at a slower rate than the normal playback rate such that relatively fewer bits are used to play back the streamed multimedia presentation. While playback begins at the reduced rate, the buffer can advantageously fill with data. Likewise, during temporary network congestion, streaming video playback can slow down with time-stretching depending on the network throughput and current buffer level or occupancy, thereby allowing relatively smooth playback without video pauses or glitches. In an network example, such as in the Internet example, the estimated playback time (corresponding to selected duration $t_d$ of FIG. 8) can correspond to the current download size divided by the estimated bandwidth as illustrated in Equation 8.

$$T = (\text{download size/bandwidth}) - \text{tolerance} \quad \text{(Eq. 8)}$$

The tolerance in this case can be a positive or negative value depending on preference, can be configured by the user, and can even include zero. In one embodiment, in order to avoid repeated changes, the play-in-time should only be changed if the time is relatively significantly different than desired, such as different by 10%.

In another embodiment, time stretching is used in connection with video editing. It will be understood that for video editing, an original source material may not be in compressed form or may be decoded from a compressed form and re-encoded rather than presented or displayed. The time-stretching techniques can advantageously be used with different frame rates on different frames of audio data to align audio with visual images.

One example of another user interface interaction is to have the "remaining" time in a status display account for the scaled time by time-stretching, rather than the media time remaining. Advantageously, this allows a user to know the actual duration of playback and allows interactive feedback as the user changes the time-stretching scale parameter. For example, the user can change the time-stretching scale parameter with a slider.

In another embodiment, the time-stretched playback can also be dynamically changed based on a user defined time stretch profile. For example, a user can configure the profile to decrease time during dull portions and increase time during interesting portions. For example, this user-defined curve can be stored as part of a separate information file per presentation, i.e., the time-stretch factor $\alpha$ can be a function of the current playback position.

In one embodiment, the time stretched playback is invoked or modified to speed up "quiet" or "boring" sections of media presentations relative to other sections. In one embodiment, a portion of a media presentation with relatively low volume and a relatively static image, i.e., relatively little average motion, is played back with time-stretching at a relatively fast rate. In one embodiment, this is implemented via a look-ahead buffer to permit the time stretching to relatively smoothly adjust ahead of the change in content type. The volume level can be determined by the values generated by the audio decoder. In one embodiment, a time average of the audio level is used. The average motion can be determined from the size of the motion vectors used in prediction in the MPEG video decoder. In one embodiment, low volume levels and low average motions are determined by comparison to predetermined thresholds, by comparison to averages, by comparison of short-term averages to long-term averages, and the like.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. A method of altering a speed of a multimedia presentation, the method comprising:
receiving encoded source data for the multimedia presentation that has been compressed by a video compression process, where the multimedia presentation is intended to be presented at a first frame rate;
decoding visual data from the encoded source data; wherein if the encoded source data is in a progressive format, the step of decoding includes converting said visual data in said progressive format into an interlaced format, for presentation on an interlaced format display device, and wherein if the encoded source data is in an interlaced format, the step of decoding includes converting said visual data in said interlaced format into a progressive format, for presentation on a progressive format display device;
decoding audio data from the encoded source data;
performing a time-stretching process on the decoded audio data, where the time stretching process changes a number of samples of the audio data such that the audio data can be presented at a second effective frame rate that is effectively different from the first frame rate, where a pitch of the audio data is controlled; and
providing decoded visual data and decoded audio data for presentation at the second effective frame rate, where the decoded visual data and the decoded audio data are synchronized.

2. The method as defined in claim 1, where the time-stretching process maintains a sampling rate of the audio data such that an original pitch of the audio data sounds unaltered.

3. The method as defined in claim 1, wherein the second effective frame rate is higher than the first frame rate, further comprising removing pictures from the multimedia presentation to effectively increase the second effective frame rate.

4. The method as defined in claim 1, wherein the second effective frame rate is lower than the first frame rate, further comprising repeating pictures from the multimedia presentation to effectively lower the second effective frame rate.

5. The method as defined in claim 1, wherein the video compression process comprises MPEG-2.

6. The method as defined in claim 1, wherein the method is performed in real time such that the time-stretching process is performed while the multimedia process is presented.

7. The method as defined in claim 1, wherein the time stretching process corresponds to extending time, such that a time-stretch factor $\alpha$, where the time-stretch factor $\alpha$ represents a ratio between a time-stretched number of audio data samples and an original number of audio data samples in a frame of data, is greater than 1.

8. The method as defined in claim 1, wherein the time stretching process corresponds to shortening time, such that a time-stretch factor $\alpha$, where the time-stretch factor $\alpha$ represents a ratio between a time-stretched number of audio data samples and an original number of audio data samples in a frame of data, is less than 1.

9. The method as defined in claim 1, wherein the encoded source data for the multimedia presentation includes time stamps indicating when decoded data is to be presented, where the first frame rate is determined by a processing of the time stamps at a first system clock speed that is specified by the video compression process, and where the second effective frame rate is determined by a processing of the time stamps at a second system clock speed that is different from the first system clock speed.

10. The method as defined in claim 1, further comprising displaying the decoded visual data on a display device.

11. The method as defined in claim 1, further comprising demultiplexing the encoded source data for the multimedia presentation from a multiplexed data channel which carries a plurality of multimedia presentations.

12. The method as defined in claim 1, further comprising reading the encoded source data from a digital versatile disc (DVD).

13. The method as defined in claim 1, further comprising disabling the time-stretching process when a time-stretch factor $\alpha$, where the time-stretch factor $\alpha$ represents a ratio between a time-stretched number of audio data samples and an original number of audio data samples in a frame of data, is outside the range of about 0.5×-2.9×, where X relates to a playback rate, where 1× relates to a playback rate at a speed intended by a video encoder.

14. The method as defined in claim 1, further comprising:
decoding sub-picture data from the encoded source data; and
providing decoded sub-picture data for presentation at the second effective frame rate, such that the sub-picture data is synchronized with the visual data and the audio data.

15. The method as defined in claim 1, further comprising:
decoding closed-caption data from the encoded source data; and
providing decoded closed-caption data for presentation at the second effective frame rate such that the closed-caption data is synchronized with the visual data and the audio data.

16. The method as defined in claim 1, further comprising:
receiving an indication of a selected amount of time; and
selecting the second effective frame rate such that playback can be completed within the selected time.

17. The method as defined in claim 16, wherein the selected amount of time corresponds to a "play in" time.

18. The method as defined in claim 16, further comprising:
providing a user interface; and
retrieving an indication from the user interface relating to the selected amount of time.

19. The method as defined in claim 16, wherein determining an amount of remaining time corresponds to using a run time for the multimedia presentation when the determination is performed before playback has initiated.

20. The method as defined in claim 16, further comprising:
determining an amount of remaining time in the multimedia presentation, where the amount of remaining time is related to playback at the first frame rate;
comparing the selected amount of time to the amount of remaining time; and
determining the second effective frame rate at least partially from the first frame rate and a ratio of the remaining time to the selected amount of time.

21. The method as defined in claim 1, further comprising:
receiving an indication of a selected time; and
selecting the second effective frame rate such that playback can be completed by the selected time.

22. The method as defined in claim 21, wherein the selected time corresponds to a desired finish time.

23. The method as defined in claim 21, further comprising:
providing a user interface, and
retrieving an indication from the user interface relating to the selected time.

24. The method as defined in claim 21, further comprising receiving an indication of an hour and a minute for the selected time.

25. The method as defined in claim 21, further comprising:
determining an amount of a first remaining time period in the multimedia presentation, where the amount of the first remaining time period is related to playback at the first frame rate;
determining an amount of a second remaining time period in the multimedia presentation, where the amount of the second remaining time period is related to playback at the second frame rate;
comparing the amount of the first remaining time period to the amount of the second remaining time period; and
determining the second frame rate at least partially from the first frame rate and a ratio of the first remaining time period to the second remaining time period.

26. The method as defined in claim 1, wherein the first frame rate corresponds to a video frame rate and the second effective frame rate corresponds to a film frame rate.

27. The method as defined in claim 1, wherein the first frame rate is about 25 frames per second (fps) and the second effective frame rate is about 24 frames per second.

28. The method as defined in claim 1, further comprising:
determining that the first frame rate is about 25 frames per second (fps);
determining that an original source for the multimedia presentation is film; and
using about 24 fps as the second effective frame rate.

29. The method as defined in claim 28, wherein a video format is PAL.

30. The method as defined in claim 28, wherein a video format is SECAM.

31. The method as defined in claim 1, further comprising:
receiving the multimedia presentation in a data stream;
monitoring an occupancy level of a decoder buffer that is adapted to temporarily store data from the data stream; and
adaptively changing the second effective frame rate in response to the occupancy level.

32. The method as defined in claim 31, wherein adaptively changing further comprises comparing an updated value for the second effective frame rate to an existing second effective frame rate, and not changing the second effective frame rate unless a difference between the updated value and the existing second effective frame rate exceeds a predetermined amount.

33. The method as defined in claim 31, further comprising:
initiating playback of the multimedia presentation earlier than indicated by the multimedia presentation, where a presentation of the multimedia presentation begins with the second effective frame rate slower than the first frame rate;
accumulating additional data in the decoder buffer as the multimedia presentation is presented at the second effective frame rate; and
presenting the multimedia presentation at the first frame rate a the buffer occupancy level has increased to a predetermined level.

34. The method as defined in claim 1, wherein the method is performed in a device powered by a battery, the method further comprising:
determining an amount of battery charge remaining in the battery; and
selecting the second effective frame rate at least partially in response to a combination of the amount of battery charge remaining and an amount of play time remaining in the multimedia presentation such that playback of the multimedia presentation can be completed before the battery runs out of charge.

35. The method as defined in claim 1, wherein the method is performed in a device coupled to an electronic network; the method further comprising:
determining a speed of the electronic network; and
selecting the second effective frame rate at least partially in response to the speed of the electronic network.

36. The method as defined in Clam 35, wherein the electronic network includes access via the Internet.

37. The method as defined in claim 1, further comprising:
determining that an audio sound level of a portion of the media presentation is low;
determining that a motion activity of the portion of the media presentation is low; and
selectively performing the time-stretching process to speed up playback of the portion with the low audio sound level and the low motion activity.

38. The method as defined in claim 1, further comprising:
storing a time-stretch profile that varies over time; and
using the time-stretch profile to control the second effective frame rate.

39. The method as defined in claim 1, further comprising:
providing a user interface; and retrieving an indication from the user interface relating to an amount by which the speed of the multimedia presentation is to be changed.

40. The method as defined in claim 39, further comprising providing a movable slider in the user interface, where movement of the slider changes the amount by which the speed of the multimedia presentation is to be changed.

41. The method as defined in claim 40, further comprising displaying the amount by which the speed of the multimedia presentation is to be changed in the user interface.

42. The method as defined in claim 40, further comprising computing and displaying a remaining time in the user interface in response to the movement of the slider.

43. The method as defined in claim 40, further comprising computing and displaying a finish time in the user interface in response to the movement of the slider.

44. The method as defined in claim 1, further comprising selectively performing the time-stretching process on the decoded audio, wherein selectively performing includes using different frame rates on different frames of audio data such that audio is realigned with visual images.

45. The method as defined in claim 1, further comprising:
receiving a navigation command for a requested task;
performing the requested task; and
resuming playback at the second effective frame rate.

46. The method as defined in claim 1, further comprising:
receiving a navigation command selectable from a plurality of navigation commands;
performing a task corresponding to the selected navigation command;
resuming playback at the second effective frame rate when the navigation command corresponds to a first group; and
resuming playback at the first frame rate when the navigation command corresponds to a second group.

47. The method as defined in claim 1, further comprising:
receiving a navigation command corresponding to skip;
performing the skip; and
resuming playback at the second effective frame rate.

48. The method as defined in claim 1, further comprising:
receiving a navigation command corresponding to fast forward;
performing the fast forward; and
resuming playback at the second effective frame rate.

49. The method as defined in claim 1, further comprising:
receiving a navigation command corresponding to rewind;
performing the rewind; and
resuming playback at the second effective frame rate.

50. The method as defined in claim 1, further comprising:
receiving a navigation command corresponding to pause;
performing the pause; and
resuming playback at the second effective frame rate.

51. The method as defined in claim 1, further comprising:
receiving a navigation command corresponding to slow motion;
performing the slow motion; and
resuming playback at the second effective frame rate.

52. The method as defined in claim 51, wherein the slow motion is presented at a third effective rate, further comprising performing the time-stretching process on the decoded audio data at the third effective rate, where the pitch of the audio data during the presentation of slow motion is controlled.

53. The method as defined in claim 52, where the time-stretching process maintains a sampling rate of the audio data such that an original pitch of the audio data sounds unaltered during the presentation of slow motion.

54. The method as defined in claim 1, further comprising:
receiving a navigation command corresponding to stop;
performing the stop; and
resuming playback at the first frame rate.

55. The method as defined in claim 1, further comprising:
receiving a navigation command corresponding to a change of a media selection;
performing the change of the media selection; and
playing back a new media presentation at the first frame rate.

56. The method as defined in claim 1, further comprising:
receiving a navigation command selected from the group consisting of skip, fast forward, rewind, stop, change media selection, pause, and slow motion;
performing the requested navigation command;
resuming playback at the second effective frame rate when the selected navigation command was selected from the group consisting of skip, fast forward, rewind, pause, and slow motion; and
resuming playback at the first frame rate when the selected navigation command was selected from the group consisting of stop and change media selection.

57. The method as defined in claim 1, further comprising:
receiving a navigation command for a seek in a forward direction at x speed, where x is greater than 1; and
presenting the multimedia presentation at a fast forward rate in response to the navigation command, where the fast forward rate has an effective frame rate of a product of x and the second effective frame rate.

58. The method as defined in claim 1, further comprising:
receiving a navigation command for seek in a reverse direction at x speed, where x is greater than 1; and
presenting the multimedia presentation backwards at a reverse rate in response to the navigation command, where the reverse rate has an effective frame rate of a product of x and the second effective frame rate.

59. The method as defined in claim 1, further comprising determining locations for adding pitch periods using correlation techniques.

60. The method as defined in claim 1, further comprising determining locations for removing pitch periods using correlation techniques.

61. The method as defined in claim 1, further comprising:
using computations of correlation to identify pitch periods;
searching for pitch periods using subsampling techniques; and
subsampling within the correlation calculation.

62. The method as defined in claim 1, further comprising:
using computations of correlation to identify pitch periods;
searching a coarse position grid with subsampling techniques to obtain a coarse search position; and
refining the coarse search position by searching around the coarse search position with a finer resolution than a resolution used to find the coarse search position.

63. The method as defined in claim 1, further comprising using overlapping windowing when combining pitch segments to reduce glitches and pops.

64. The method as defined in claim 1, further comprising varying a size of a search range for a pitch period, wherein varying depends on time stretch factor and pitch period size.

65. The method as defined in claim 1, further comprising varying a size for a signal segment, wherein varying depends on a time stretch factor and pitch period size.

66. A computer program product containing a computer readable storage medium with computer executable instructions embodied therein for altering a speed of an original multimedia presentation, comprising:

instructions for receiving encoded source data for the original multimedia presentation that has been compressed by a video compression process, where the multimedia presentation is intended to be presented at a first frame rate;

instructions for decoding visual data from the encoded source data; wherein the instructions for decoding the visual data include instructions for converting said visual data if it is in a progressive format into an interlaced format, for presentation on an interlaced format display device, and instructions for converting said visual data if it is in an interlaced format into a progressive format, for presentation on a progressive format display device;

instructions for decoding audio data from the encoded source data;

instructions for performing a time-stretching process on the decoded audio data, where the time stretching process changes a number of samples of the audio data, where the time stretching process changes a number of samples of the audio data such that the audio data can be presented at a second effective frame rate that is effectively different from the first frame rate, where a pitch of the audio data is controlled; and instructions for providing decoded visual data and decoded audio data for presentation at the second effective frame rate, where the decoded visual data and the decoded audio data are synchronized.

67. A circuit for altering a speed of a multimedia presentation comprising:

means for receiving encoded source data for the multimedia presentation that has been compressed by a video compression process, where the multimedia presentation is intended to be presented at a first frame rate;

means for decoding visual data from the encoded source data; said means including converting said visual data if it is in a progressive format into an interlaced format, for presentation on an interlaced format display device, and converting said visual data if it is in an interlaced format into a progressive format, for presentation on a progressive format display device;

means for decoding audio data from the encoded source data;

means for performing a time-stretching process on the decoded audio data, where the time stretching process changes a number of samples of the audio data such that the audio data can be presented at a second effective frame rate that is effectively different from the first frame rate, where a pitch of the audio data is controlled; and means for providing decoded visual data and decoded audio data for presentation at the second effective frame rate, where the decoded visual data and the decoded audio data are synchronized.

68. A digital video player that embodies the circuit of claim 67.

69. A digital video recorder (DVR) that embodies the circuit of claim 67.

70. A DVD player that embodies the circuit of claim 67.

71. A method of presenting an original source multimedia presentation comprising:

receiving an indication of a selected time duration;

converting the original source multimedia presentation if it is in a progressive format into an interlaced format, for presentation on an interlaced format display device, and converting the original source multimedia presentation if it is in an interlaced format into a progressive format, for presentation on a progressive format display device;

playing back the original source multimedia presentation at a revised playback rate from an original playback rate such that playback can be completed within the selected time duration; and modifying audio data during playback such that a pitch of a time-stretched audio data is controlled.

72. The method as defined in claim 71, wherein modifying audio data further comprises modifying such that a pitch of the time-stretched audio data sounds unchanged from the original playback rate to the revised playback rate.

73. The method as defined in claim 71, further comprising providing a user interface configured to permit entry of the selected time duration.

74. A method of presenting an original source multimedia presentation comprising:

receiving an indication of a selected time;

converting the original source multimedia presentation if it is in a progressive format into an interlaced format, for presentation on an interlaced format display device, and converting the original source multimedia presentation if it is in an interlaced format into a progressive format, for presentation on a progressive format display device;

playing back the original source multimedia presentation at a revised playback rate from an original playback rate such that playback can be completed by the selected time; and modifying audio data during playback such that a pitch of a time-stretched audio data is controlled.

75. The method as defined in claim 74, wherein modifying audio data further comprises modifying such that a pitch of the time-stretched audio data sounds unchanged from the original playback rate to the revised playback rate.

76. The method as defined in claim 74, further comprising providing a user interface configured to permit entry of the selected time.

77. The method as defined in claim 74, further comprising:

determining whether playback can be completed by the selected time at the original playback rate; and not changing to a revised playback rate when playback can be completed by the selected time at the original playback rate.

78. A computer readable storage medium, encoded with a computer program and user interface comprising:

a module configured to receive an indication of a request for a speed of an original source multimedia presentation where the speed relates to a playback speed and can correspond to playback speeds other than a normal playback speed; wherein if said original source multimedia presentation is in with a progressive format it is first converted into an interlaced format, for presentation on an interlaced format display device, and if said original source multimedia presentation is in with an interlaced format it is first converted into a progressive format, for presentation on a progressive format display device;

a module configured to provide the indication to a video decoder a module configured to modify audio data to a time stretched audio data such that a pitch of the time stretched audio data sounds unchanged at the playback speed.

79. The user interface as defined in claim 78, wherein the request for the change in speed is expressed relative to an existing speed.

80. The user interface as defined in claim 78, wherein the indication corresponds to a time duration, where the time duration corresponds to when completed playback of the original source multimedia presentation is desired.

81. The user interface as defined in claim 78, wherein the indication corresponds to a selected time, which corresponds to when completed playback of the digital original source multimedia presentation is desired.

82. A method of presenting a digital original source multimedia presentation, where the method comprises:
presenting a source of visual data and audio data at a playback rate other than a speed of playback of the digital original source multimedia presentation as specified by a corresponding video compression standard;
converting the original source multimedia presentation if it is in a progressive format into an interlaced format, for presentation on an interlaced format display device, and converting the digital original source multimedia presentation if it is in an interlaced format into a progressive format, for presentation on a progressive format display device; and
modifying the audio data to a time-stretched audio data such that a pitch of the time-stretched audio data is controlled.

83. The method as defined in claim 82, wherein modifying the audio data further comprises modifying such that the pitch of the time-stretched audio data sounds unchanged at the playback rate.

84. The method as defined in claim 82, wherein the method is performed in real time.

85. The method as defined in claim 82, wherein the video compression standard corresponds to MPEG-2.

86. The method as defined in claim 82, further comprising changing the playback rate to another playback rate in real time while the method is performed.

87. The method as defined in claim 82, further comprising:
receiving an indication of a selected amount of time; and
selecting the playback rate such that playback can be completed within the selected time.

88. The method as defined in claim 82, further comprising:
receiving an indication of a selected time; and
selecting the playback rate such that playback can be completed by the selected time.

89. The method as defined in claim 82, further comprising providing a user interface for setting the playback rate.

90. A computer program product containing a computer readable storage medium with computer executable instructions embodied therein for presenting a digital original multimedia presentation, comprising:
instructions for presenting visual data and audio data at a playback rate other than a speed of playback of the digital original multimedia presentation as specified by a corresponding video compression standard; wherein the instructions for presenting the visual data include instructions for converting said visual data if it is in a progressive format into an interlaced format, for presentation on an interlaced format display device, and instructions for converting said visual data if it is in an interlaced format into a progressive format, for presentation on a progressive format display device; and
instructions for modifying the audio data to a time-stretched audio data such that a pitch of the time-stretched audio data is controlled.

91. A circuit for presenting a digital original multimedia presentation in a video decoder comprising:
means for presenting visual data and audio data at a playback rate other than a speed of playback of the digital original multimedia presentation as specified by a corresponding video compression standard; wherein the means for presenting visual data include means for converting said visual data if it is in a progressive format into an interlaced format, for presentation on an interlaced format display device, and means for converting said visual data if it is in an interlaced format into a progressive format, for presentation on a progressive format display device; and
means for modifying the audio data to a time-stretched audio data such that a pitch of the time-stretched audio data is controlled.

92. A circuit for presenting a digital original multimedia presentation in a video decoder comprising:
a module configured to present visual data and audio data at a playback rate other than a speed of playback of the digital original multimedia presentation as specified by a corresponding video compression standard; wherein the presentation of the visual data includes converting said visual data if it is in a progressive format into an interlaced format, for presentation on an interlaced format display device, and converting said visual data if it is in an interlaced format into a progressive format, for presentation on a progressive format display device; and
a module configured to modify the audio data to a time-stretched audio data such that a pitch of the time-stretched audio data sounds unchanged at the playback rate.

93. A digital video player that embodies the circuit of claim 91.

94. A DVD player that embodies the circuit of claim 91.

95. A digital video recorder (DVR) that embodies the circuit of claim 91.

* * * * *